US009003763B2

(12) United States Patent
Coney

(10) Patent No.: US 9,003,763 B2
(45) Date of Patent: Apr. 14, 2015

(54) COMPRESSED AIR ENERGY SYSTEM INTEGRATED WITH GAS TURBINE

(71) Applicant: LightSail Energy, Inc., Berkeley, CA (US)

(72) Inventor: Michael Coney, Swindon (GB)

(73) Assignee: LightSail Energy, Inc., Berkeley, CA (US)

( * ) Notice: Subject to any disclaimer, the term of this patent is extended or adjusted under 35 U.S.C. 154(b) by 0 days.

(21) Appl. No.: 14/037,217

(22) Filed: Sep. 25, 2013

(65) Prior Publication Data

US 2014/0096523 A1    Apr. 10, 2014

Related U.S. Application Data

(63) Continuation-in-part of application No. 13/645,327, filed on Oct. 4, 2012.

(51) Int. Cl.
*F01K 23/06* (2006.01)
*F01K 23/10* (2006.01)
*F02C 6/16* (2006.01)
*F01K 23/02* (2006.01)

(52) U.S. Cl.
CPC ............... *F01K 23/06* (2013.01); *F01K 23/10* (2013.01); *F02C 6/16* (2013.01); *Y02E 20/16* (2013.01); *F01K 23/02* (2013.01)

(58) Field of Classification Search
CPC .......... F01K 23/10; F01K 23/06; F02C 6/16; F02C 7/10; F02C 1/04; Y02E 60/15; Y02E 20/16
USPC ............ 60/39.182, 39.183, 39.511, 727, 659
See application file for complete search history.

(56) References Cited

U.S. PATENT DOCUMENTS

| | | | | | |
|---|---|---|---|---|---|
| 4,060,337 | A | * | 11/1977 | Bell, III | 416/186 R |
| 4,100,745 | A | * | 7/1978 | Gyarmathy et al. | 60/652 |
| 4,347,706 | A | * | 9/1982 | Drost | 60/659 |
| 4,465,027 | A | * | 8/1984 | Steinegger | 122/406.4 |
| 4,829,763 | A | | 5/1989 | Rao | |
| 4,893,466 | A | | 1/1990 | Egnell et al. | |
| 4,922,709 | A | * | 5/1990 | Hendriks | 60/39.183 |
| 5,165,239 | A | * | 11/1992 | Bechtel et al. | 60/683 |

(Continued)

OTHER PUBLICATIONS

International Search Report and Written Opinion for PCT/US2013/061759, filed Sep. 25, 2013.

(Continued)

*Primary Examiner* — William H Rodriguez
*Assistant Examiner* — Carlos A Rivera

(57) ABSTRACT

An apparatus performs a power cycle involving expansion of compressed air utilizing high pressure (HP) and low pressure (LP) air turbines located upstream of a gas turbine. The power cycle involves heating of the compressed air prior to its expansion in the HP and LP air turbines. Taking into consideration fuel consumption to heat the compressed air, particular embodiments may result in a net production of electrical energy of ~2.2-2.5× an amount of energy consumed by substantially isothermal air compression to produce the compressed air supply. Although pressure of the compressed air supply may vary over a range (e.g. as a compressed air storage unit is depleted), the gas turbine may run under almost constant conditions, facilitating its integration with the apparatus. The air turbines may operate at lower temperatures than the gas turbine, and they may include features of turbines employed to turbocharge large reciprocating engines.

14 Claims, 17 Drawing Sheets

(56) References Cited

U.S. PATENT DOCUMENTS

| | | | |
|---|---|---|---|
| 5,386,688 A * | 2/1995 | Nakhamkin | 60/774 |
| 5,537,822 A * | 7/1996 | Shnaid et al. | 60/659 |
| 5,778,675 A * | 7/1998 | Nakhamkin | 60/652 |
| 6,141,953 A | 11/2000 | Mongia et al. | |
| 6,401,458 B2 | 6/2002 | Jacobson | |
| 6,745,569 B2 * | 6/2004 | Gerdes | 60/727 |
| 6,874,322 B2 * | 4/2005 | Schwarzott | 60/772 |
| 7,033,420 B2 * | 4/2006 | Liebig | 95/251 |
| 7,150,154 B2 * | 12/2006 | Althaus et al. | 60/727 |
| 7,269,956 B2 * | 9/2007 | Gericke et al. | 60/782 |
| 7,389,644 B1 * | 6/2008 | Nakhamkin | 60/772 |
| 7,406,828 B1 * | 8/2008 | Nakhamkin | 60/772 |
| 7,614,237 B2 * | 11/2009 | Nakhamkin | 60/772 |
| 7,661,268 B2 * | 2/2010 | Althaus et al. | 60/727 |
| 7,770,376 B1 * | 8/2010 | Brostmeyer | 60/39.182 |
| 7,954,330 B2 * | 6/2011 | Althaus | 60/727 |
| 8,689,566 B1 * | 4/2014 | Coney | 60/774 |
| 2002/0194832 A1 | 12/2002 | Smith | |
| 2005/0121532 A1 | 6/2005 | Reale et al. | |
| 2005/0235625 A1 | 10/2005 | Gericke et al. | |
| 2007/0256424 A1 * | 11/2007 | Briesch et al. | 60/773 |
| 2009/0000271 A1 | 1/2009 | Kupratis | |
| 2010/0024445 A1 * | 2/2010 | Cichanowicz | 62/86 |
| 2011/0094212 A1 * | 4/2011 | Ast et al. | 60/327 |
| 2011/0094236 A1 | 4/2011 | Finkenrath et al. | |
| 2012/0000204 A1 | 1/2012 | Kesseli et al. | |

OTHER PUBLICATIONS

Nakhamkin, M. et al., "Second Generation of CAES Technology—Performance, Operations, Economics, Renewable Load Management, Green Energy", Dec. 10, 2009, pp. 1-12.

Office Action for U.S. Appl. No. 14/259,071, dated Jun. 18, 2014.

* cited by examiner

COMPRESSED AIR ENERGY SYSTEM INTEGRATED WITH GAS TURBINE

CROSS-REFERENCE TO RELATED APPLICATION

The instant application is a continuation-in-part of the U.S. Nonprovisional patent application Ser. No. 13/645,327 filed Oct. 4, 2012 and incorporated by reference in its entirety herein for all purposes.

BACKGROUND

Compressed air energy storage during off-peak periods can efficiently utilize surplus power from renewable and other sources. During periods of peak demand, heat may be applied to the compressed air to generate much more electrical energy than was originally stored. Compressed air energy storage avoids issues associated with battery storage such as limited lifetime, materials availability, or environmental friendliness.

SUMMARY

An apparatus performs a power cycle involving expansion of compressed air utilizing high pressure (HP) and low pressure (LP) air turbines located upstream of a gas turbine, which may be modified by removal of the gas turbine compressor. The power cycle involves heating of the compressed air prior to its expansion in the HP and LP air turbines. Taking into consideration fuel consumption to heat the compressed air, particular embodiments may result in a net production of electrical energy of ~2.2-2.5× an amount of energy consumed by substantially isothermal air compression to produce the compressed air supply. Although pressure of the compressed air supply may vary over a range (e.g. as a compressed air storage unit is depleted), the gas turbine may run under almost constant conditions, facilitating its integration with the apparatus. The air turbines may operate at lower temperatures than the gas turbine, and may include features of turbines employed to turbocharge large reciprocating engines.

DETAILED DESCRIPTION

Figure 1:
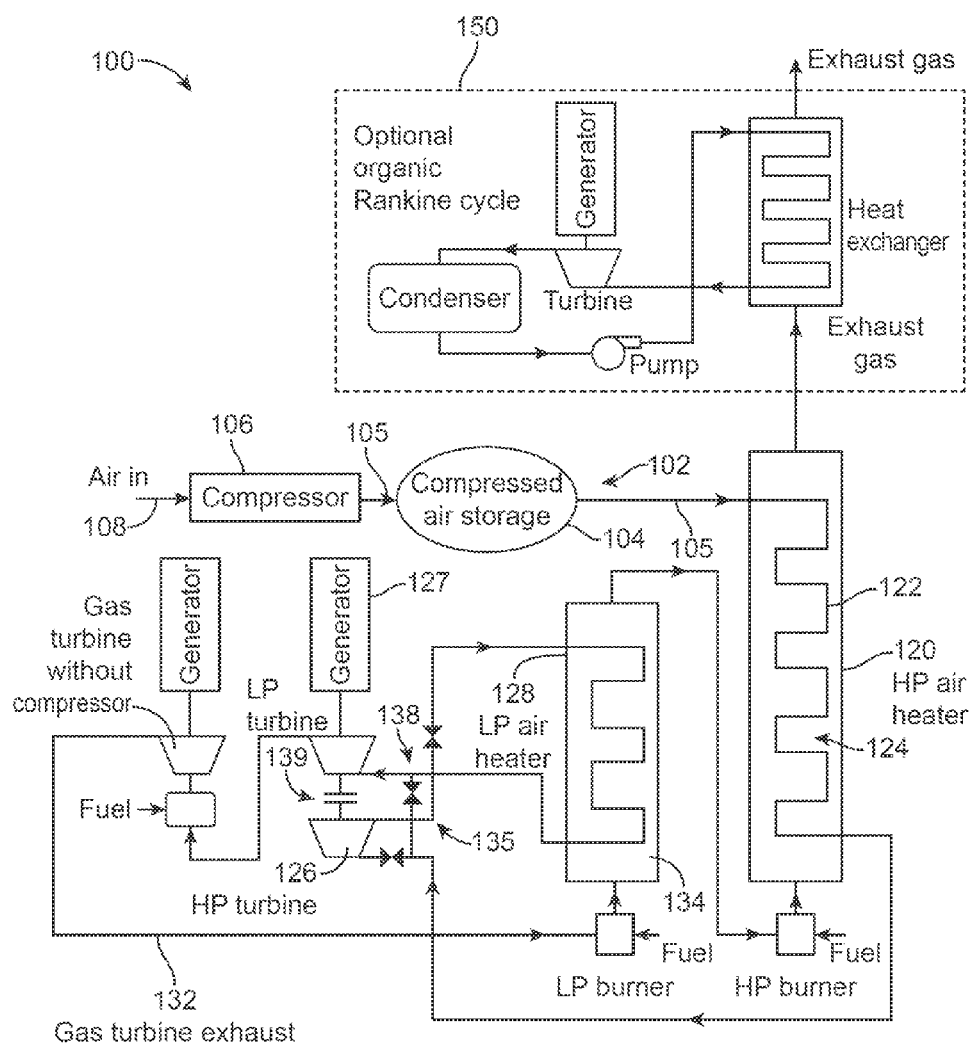
FIG. 1 shows a simplified diagram of a compressed air energy system according to an embodiment.

FIG. 1 shows a simplified diagram of a compressed air energy system according to an embodiment. System 100 comprises a source of compressed air 102, which in this particular embodiment comprises a compressed air storage unit 104. However, the presence of a compressed air storage unit is not required in all embodiments, and alternative embodiments could feature an air compressor or other source of compressed air.

Compressed air 105 is flowed into the compressed air storage unit from air compressor 106. In some embodiments, the air compressor may comprise a multi-stage compressor with intercooling between stages.

According to certain embodiments, air compressor 106 may function to compress inlet air 108 in a substantially isothermal manner, for example utilizing heat exchange across a gas/liquid interface having a high surface area. Examples of such substantially isothermal compression (as well as substantially isothermal expansion) are described in U.S. Patent Publication No. 2011/0115223 ("the Publication"), which is hereby incorporated by reference in its entirety. It should be appreciated that certain of the designs discussed below may include one or more concepts discussed in the Publication.

Specifically, FIG. 1 shows the compressed air being fed to the inlet of a high pressure (HP) air heater 120. This HP air heater may be of tubular design, with high pressure air present inside the tubes 122, and low pressure exhaust gas being present within the space 124 enclosing the tubes. In particular embodiments, the HP air heater heats the incoming compressed air to about 700° C.

The hot compressed air then enters the HP air turbine 126. Therein, the hot compressed air may be expanded with a variable pressure ratio. In certain embodiments this variable pressure ratio may be up to 2.5 or even larger, depending on the pressure in the compressed air energy store. Expansion of the gas serves to drive first generator 127 to produce electricity.

Next, the partially expanded compressed air enters the low pressure (LP) air heater 128, where it is reheated before entering the inlet of the LP air turbine. According to some embodiments, the partially expanded compressed air may be reheated to the same temperature (e.g. 700° C. in particular embodiments).

The hot, partially expanded compressed air then enters the LP air turbine 130. Therein, the hot air may again be expanded to drive the first generator to produce even more electricity.

Design for the HP and/or LP air turbines may be inspired in part by turbines employed to turbocharge large reciprocating engines. Specifically, the HP and LP air turbines may also be equipped with variable nozzle geometry, providing greater flexibility to deal with large variations in flow rate and inlet pressure. Moreover, unlike the engine turbochargers which have to cope with dirty engine exhaust gases, the HP and LP air turbines proposed herein could run with clean air, further simplifying their design and operation.

Figure 2:
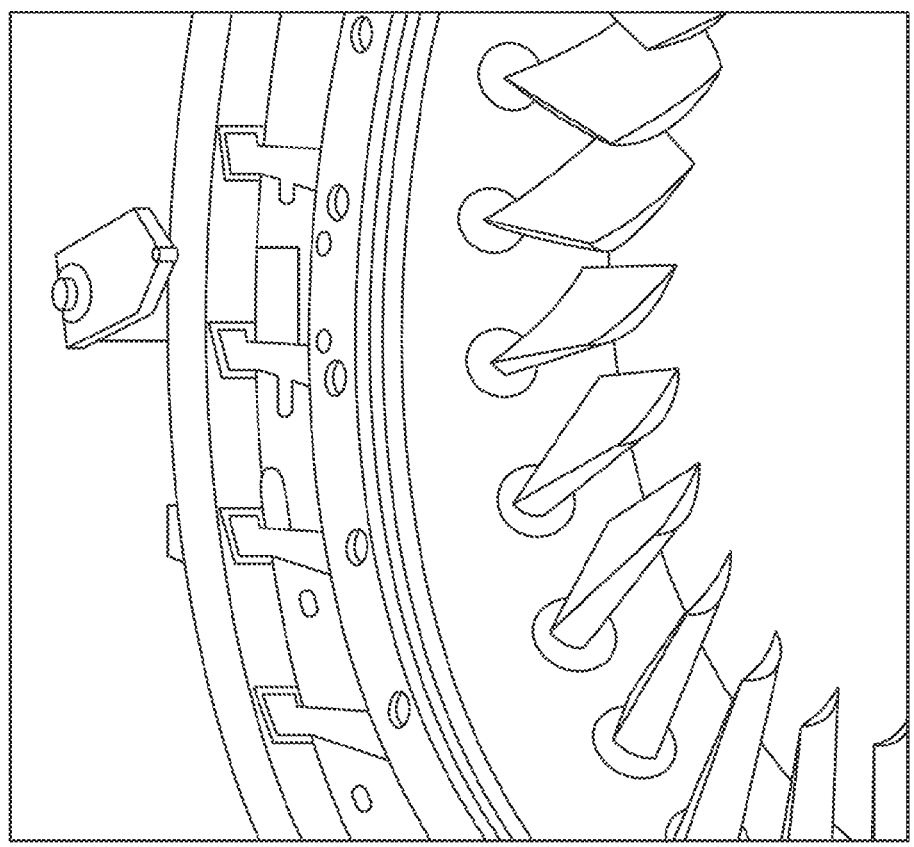
FIG. 2 shows an illustration of a turbine used as a turbocharger.

FIG. 2 shows a variable nozzle ring for a turbocharger manufactured by the ABB Group of Zurich, Switzerland. It can be seen from FIG. 2 that the nozzle vanes can be rotated to achieve the optimum incidence angle of the engine exhaust gas on the moving blades of the turbine. Also, the mechanism to achieve the adjustment of the nozzle vanes is located outside the casing containing the gas flow path, where the temperature is lower.

In certain embodiments it may be possible to rotate the so-called stationary vanes or nozzles through any angle relative to the flow direction, limited only by the interference between adjacent vanes. The mechanism for rotating the blades is outside the casing of the turbine and can be kept cool.

The rotation may be performed slowly in order to adjust to the new conditions. Hence these vanes may be effectively considered to be stationary.

However, the blades attached to the turbine shaft are at a fixed angle relative to the flow direction. These blades rotate at high speed.

A study of the aerodynamics may determine optimum arrangements with the flexibility to deal with the range of conditions expected. In certain embodiments, the HP turbine may comprise a single stage of adjustable stationary vanes, and its associated rotor comprising blades with a fixed flow angle.

By contrast, in certain embodiments the LP turbine may need to cope with a pressure ratio of six. The LP turbine may have two stages, with two rows of adjustable stationary vanes alternating with two rows of rotating blades of fixed angle.

In various embodiments the compressed air may be configured to exit the LP turbine at a pressure and temperature corresponding to the normal inlet conditions of the gas turbine combustor. This facilitates integration of the instant apparatus with an existing gas turbine without its compressor.

To achieve this compatibility, the LP turbine may also exhibit a variable pressure ratio. In particular embodiments, this pressure ratio may vary between about 2.5-6.

Some of the compressed air supplied to the gas turbine may not be used for combustion. Instead, the compressed air may be used for internal cooling of the stationary and moving blades of the gas turbine.

In order to retain the original cooling performance of the existing gas turbine, the temperature of the supplied compressed air may not exceed that which would have been provided from the compressor element of the gas turbine.

It is noted that under certain circumstances, the avoidance of a compressor element may reduce the cost of the gas turbine. And, where the gas turbine is of a single shaft design, it may be possible to remove the gas turbine compressor blades from the shaft and use the existing gas turbine combustor and turbine rotor.

It is further noted that in some embodiments, the application of the gas turbines to the present cycle may call for a modest increase in back pressure. However this adjustment is similar to that encountered when a heat recovery steam generator is added into a conventional combined cycle system.

After performing the required cooling on the initial blade row(s) of the gas turbine, the portion of the compressed air used for turbine blade cooling, passes out of small holes in the turbine blades and mixes with the main combustion gas flow through the downstream blade rows.

After leaving the gas turbine, the hot exhaust combustion gas 132 flows to the LP burner. Additional fuel is added to raise the exhaust gas temperature in order to heat the compressed air in the LP heater. For example, the exhaust gas temperature of the LP air heater may be raised to 720° C., where the compressed gas carried by the tubes is being reheated to 700° C.

After leaving the LP heater, the combustion gases are reheated (e.g. to 720° C.) once more in the HP burner. The heated combustion gases are then flowed to the enclosed space of the HP heater in order to heat the compressed air that is flowing through the tubes therein.

It is noted that in this particular embodiment, both the LP and HP burners are duct burners. In such duct burners, additional fuel is burned in the low pressure environment (e.g. the low pressure exhaust gas of the gas turbine). As duct burners are established technology, the expense and complexity of developing fuel combustion at high pressures can be avoided.

As previously noted, in this embodiment the compressed air is supplied from a compressed air storage unit. As the supply of compressed air is depleted in the unit, the pressure of the compressed gas may drop.

When the pressure of the stored compressed air drops below a certain amount (e.g. 100 bar), it may no longer be appropriate to have both the high and low pressure air turbines in operation. Under these conditions, the apparatus may be configured to route the heated high pressure air to the LP turbine, bypassing the HP air turbine. This selective routing of the compressed gas may be accomplished, for example, by the use of valving 135.

Since additional heat would not be added by the LP burner when the HP turbine is bypassed, it is not necessary for the air to go through the LP heater tubes. To minimize pressure drop and heat losses, it may be desirable for the compressed air (below 100 bar) to bypass the LP heater tubes as well as the HP turbine, and flow directly from the outlet of the HP heater to the LP air turbine. In certain embodiments this may be accomplished via multi-way valving scheme 138.

FIG. 1 shows only one particular embodiment, and others are possible. For example, there are several ways of configuring valves or other flow-switching devices in order to make the transition from two air turbines, two burners, and two air heaters, to a single air turbine, burner, and air heater.

Thus alternative embodiments offer the choice of diverting not only the high pressure compressed air, but also the low pressure exhaust gas. The HP burner and HP air heater could be bypassed, and all the flow occurring through the LP burner and air heater.

Ultimately, the specific design employed in particular embodiments could represent a balance of factors. For example, a design could represent a compromise between the cost and complexity of the valve arrangement, versus minimization of the pressure drop in both the compressed air and in the combustion gas.

FIG. 1 indicates a mechanism 139 allowing the HP air turbine to be de-coupled from the air turbine shaft. Again, this may be desirable in operation modes where the compressed gas is provided at low pressure and bypasses the HP air turbine.

At the conclusion of the power cycle, the exhaust combustion gas is outlet from the enclosed space of the HP air heater. It is noted that the heat capacity of the combustion gases in the LP heater and the HP heater, is higher than that of the incoming compressed air. Thus, the temperature difference between the combustion gas and the compressed air can widen from the 20° C. difference that may occur at the outlets of the LP and HP burners.

One possible result of this widening in temperature difference is that the exhaust combustion gas temperature at the outlet of the HP heater may increase, for example to about 200° C. or more. In certain embodiments, the energy represented by this heat can be recovered and converted to electric power utilizing a simple organic Rankine cycle.

An organic Rankine cycle (ORC) is used for low temperature applications such as power generation from geothermal water, and heat recovery from industrial waste heat and from biomass-fired combined heat and power plants. The organic fluid is usually a hydrocarbon or a refrigerant.

Organic fluids have a lower boiling point than water. In addition, organic fluids have a lower latent heat relative to their specific heat. As a result, organic fluids may be more suitable than water for extracting sensible heat at moderate temperatures (e.g. less than about 300° C.) from a waste gas or liquid, in which the temperature falls as the heat is extracted.

Accordingly, organic Rankine cycles are usually much simpler than steam Rankine cycles. Organic Rankine cycles do not need multiple feed-heating stages or multiple boiler pressures. Neither do ORCs require re-heat stages. This greater level of simplicity results in organic Rankine cycles being suited for smaller systems, in which the complex configurations of a large steam plant (e.g. combined cycle plant) may not be cost justified.

FIG. 1 shows the inclusion of a separate ORC apparatus 150 that is configured to receive the exhaust gas outlet from the enclosed space of the HP air heater. Heat from the exhaust gas is exchanged with an organic fluid circulated by a pump through a condenser and a turbine. The energy from the turbine is used to drive a generator to output electricity.

The use of a back-end ORC installation is not required and is an optional feature that can serve to enhance the performance of an already-efficient system. Such enhancement is discussed in connection with certain examples given below.

In order to quantify possible performance of the apparatus according to an embodiment, a model for the proposed air expansion circuit was created. First, certain commercially available gas turbines were characterized in a gas turbine sub-model using publicly available information. The sub-model is a simplified representation of an actual gas turbine, based upon the information available. The parameters of pressure ratio, air mass flow, efficiency and exhaust gas temperature were represented.

In particular, turbine information can be found in sources such as the Gas Turbine World Handbook, manufacturers' websites, or in published papers. Parameters which may typically be found from such sources include electrical power output, compressor pressure ratio, the compressor air flow rate, the heat rate (or thermal efficiency), and the exhaust gas temperature.

The characterization is performed by a computer model of the original gas turbine using published information in combination with informed assumptions concerning some parameters, for which no published data is available. The gas turbine sub-model assumes that the air which is used for cooling of the turbine blades, is mixed in with the main flow just after the first row of moving turbine blades. This reduces the gas temperature for the downstream parts of the turbine.

The model is used to predict the gas turbine performance, adjusting assumptions to obtain the best fit with the available information. The following Table 1 shows the main results of the characterization exercise for sub-models of four single-shaft simple cycle gas turbines. Published data on net electrical power, gas turbine electrical efficiency and gas turbine exit temperature are compared with the values calculated by the gas turbine sub-model, resulting in close agreement.

| GAS TURBINE CHARACTERIZATION | | | | |
|---|---|---|---|---|
| Manufacturer | Siemens | Kawasaki | Solar | GE |
| Gas turbine name | SGT-100 | M7A-03 | Taurus 70 | 7FA |
| Published net electrical power (kW) | 5400 | 7830 | 7965 | 215769 |
| Calculated net electrical power (kW) | 5392 | 7842 | 7682 | 215835 |
| Published electrical efficiency (%) | 31.0% | 34.1% | 34.3% | 38.6% |
| Calculated gas turbine efficiency (%) | 31.3% | 34.0% | 34.3% | 38.2% |
| Published turbine exit temperature (° C.) | 531 | 520 | 510 | 599 |
| Calculated turbine exit temperature (° C.) | 533 | 520 | 510 | 599 |

The gas turbine sub-model which was used to characterize the unmodified commercial gas turbine was then incorporated in the model of the overall system shown in FIG. 1. The following Table 2 shows the additional input data used to model the circuit incorporating the SGT-100 gas turbine. The first data column shows input data for the maximum air pressure of 200 bar. The second data column shows input data for the minimum air pressure of 40 bar.

|                                                            | Max air pressure | Min air pressure |
| ---------------------------------------------------------- | ---------------- | ---------------- |
| Gas turbine manufacturer                                   | Siemens          | Siemens          |
| Gas turbine type                                           | SGT-100          | SGT-100          |
| Maximum air inlet temperature to gas turbine (° C.)        | 410.54           | 410.54           |
| Gas turbine air flow rate (kg/s)                           | 20.235           | 20.235           |
| Compressed air storage exit pressure (bar)                 | 200              | 40               |
| Pressure ratio of HP air turbine                           | 2.45             | 1.00             |
| Compressed air storage exit temp (° C.)                    | 30               | 30               |
| Isothermal compressor efficiency                           | 85%              | 85%              |
| HP air heater secondary DP (%)                             | 1%               | 1%               |
| LP air heater, secondary DP (%)                            | 2%               | 2%               |
| HP and LP air heater minimum DT (° C.)                     | 20               | 20               |
| HP and LP gas burner efficiency (%)                        | 99.7%            | 99.7%            |
| LP burner DP (%)                                           | 3%               | 3%               |
| HP burner DP (%)                                           | 3%               | 3%               |
| Inlet temperature of HP air turbine (if not bypassed) (° C.) | 700            | —                |
| Inlet air temperature of LP air turbine (° C.)             | 700              | 564              |
| LP air heater primary side DP (%)                          | 3%               | 3%               |
| HP air heater primary side DP (%)                          | 3%               | 3%               |
| Gas LHV calorific value, MJ/m$^3$ (at 1 atm, 15° C.)       | 34.82            | 34.82            |
| Gas density (at 1 atm, 15° C.)                             | 0.723            | 0.723            |
| Stoichiometric ratio of $CO_2$ (by vol) to fuel gas        | 1.04             | 1.04             |
| Stoichiometric ratio of $H_2O$ (by vol) to fuel gas        | 2.021            | 2.021            |
| Isentropic efficiency of HP air turbine                    | 87.0%            | 87.0%            |
| Isentropic efficiency of LP air turbine                    | 87.0%            | 87.0%            |
| LP and HP air turbine mechanical & electrical efficiency   | 97.0%            | 97.0%            |
| Atmospheric pressure, bar                                  | 1.01325          | 1.01325          |
| Atmospheric air temperature (° C.)                         | 15               | 15               |
| Atmospheric humidity                                       | 60%              | 60%              |

Although the operating conditions of the gas turbine within the system are nearly the same as that of the stand-alone gas turbine, there are some minor differences. In particular, the presence of the heat exchangers (air heaters) downstream of the gas turbine causes a rise in the back-pressure, which reduces the output and raises the gas turbine outlet temperature. Also, there are some conditions under which the temperature of the air entering the gas turbine combustor is reduced below the normal value. This causes a small increase in the amount of fuel required to achieve the design operating temperature. The gas turbine sub-model takes these effects into account.

Table 2 shows the input data for the various parts of the system, including heat exchanger pressure losses, minimum temperature differences in the heat exchangers, and the isentropic efficiencies of the HP and LP turbines. The feature of bypassing the HP air turbine when the air storage pressure drops below 100 bars, is represented in the model by inputting a value of 1.0 for the pressure ratio of the HP turbine.

As shown in Table 2, the same fractional pressure losses have been assumed for low pressure operation of the circuit as for high pressure operation even though there is a possibility of bypassing some elements of the circuit during low pressure operation. It is also seen from Table 2 that when the air source pressure is reduced to 40 bars, the air inlet temperature of the LP air turbine is reduced below the 700° C. figure, which is assumed at 200 bar air source pressure. This avoids too high an air inlet temperature to the gas turbine combustor. When the air source pressure is low, the pressure ratio of the LP air turbine is reduced and so the temperature drop in the LP air turbine is also reduced.

Figure 3:
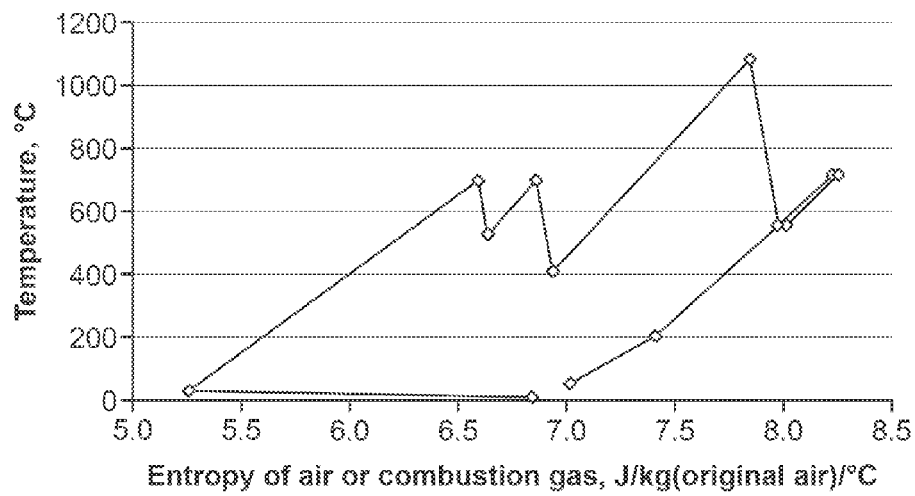
FIG. 3 is a temperature-entropy (T-S) diagram for an SGT-100 gas turbine with 200 bar air source pressure.
Figure 4:
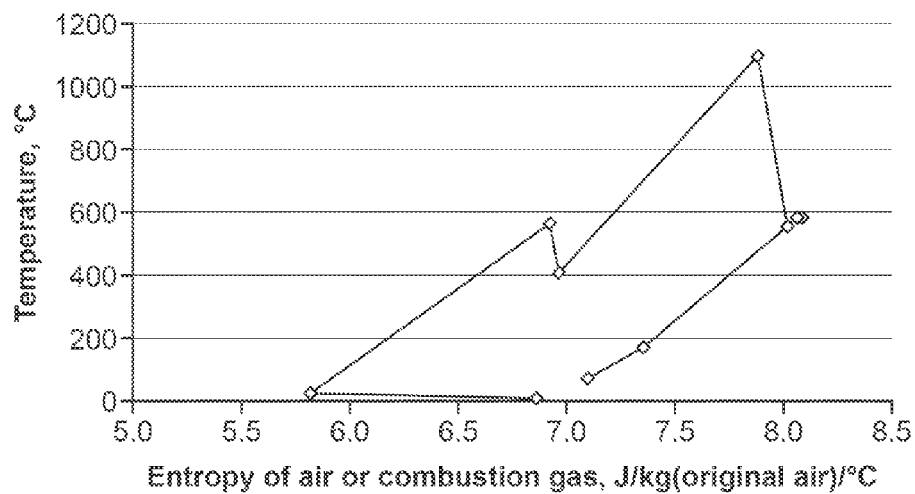
FIG. 4 is a T-S diagram for the SGT-100 gas turbine with 40 bar air source pressure.

FIG. 3 and FIG. 4 are temperature-entropy (T-S) diagrams for the SGT-100 gas turbine at the maximum air source pressure of 200 bar and at the minimum pressure of 40 bar. The figures show the change from two- to one-air turbine expansion, as the air source pressure is reduced.

Figure 5:
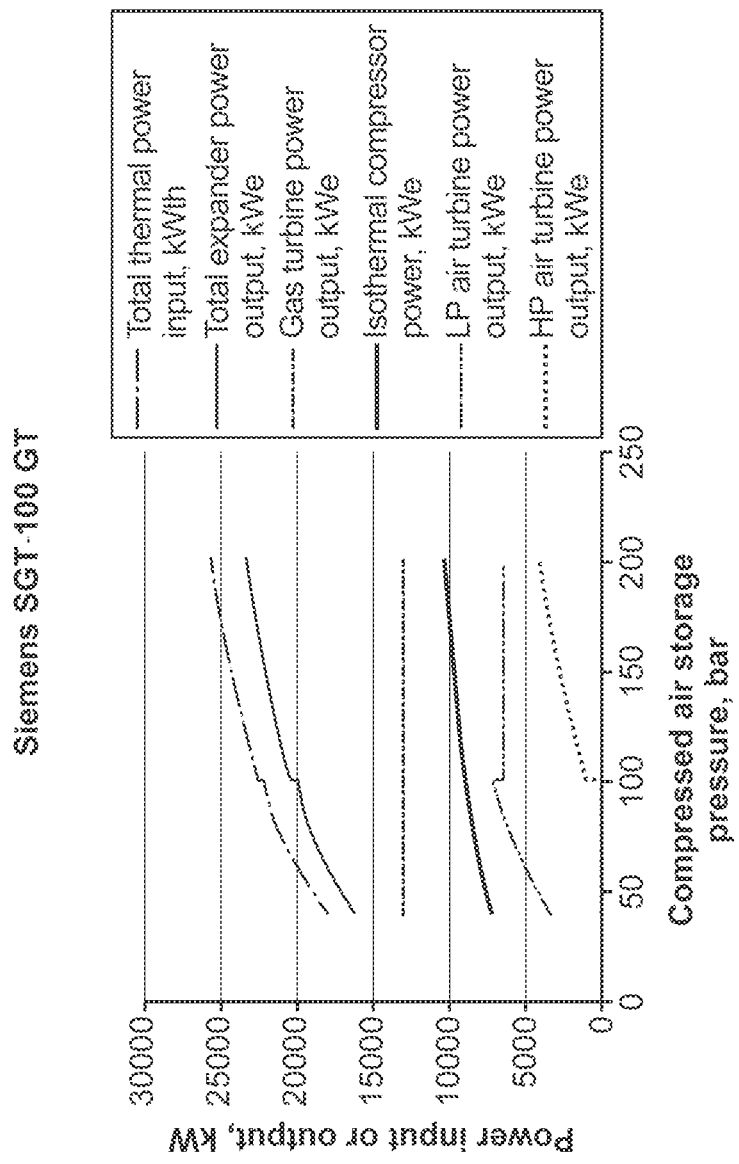
FIG. 5 shows how the various power inputs and outputs vary over the range of air source pressures in a system based on the SGT-100 gas turbine.

Various performance calculations were made utilizing the model for the system shown in FIG. 1 without the optional organic Rankine cycle. FIG. 5 shows power inputs and outputs for the SGT-100 gas turbine, over a range of air source pressures.

FIG. 5 shows how the various power inputs and outputs vary over the range of air source pressures. It is seen that the gas turbine power output is relatively constant throughout this range. The power demand of the isothermal compressor increases with the air storage pressure, as a constant compressor efficiency of 85% relative to ideal isothermal compression is assumed.

The LP air turbine output increases over the range from 40-100 bar air source pressure. Then, there is a slight dip and the LP air turbine power output is constant above 100 bar air storage pressure.

The HP air turbine power output reduces from about 4000 kW to about 1000 kW as the air source pressure reduces from 200 bar to 100 bar. Below 100 bar, the HP air turbine is bypassed and therefore produces no power.

FIG. 5 also shows that the total power output is not much less than the total thermal input to the expansion cycle. This indicates a high thermal efficiency of the expansion process.

Figure 6:
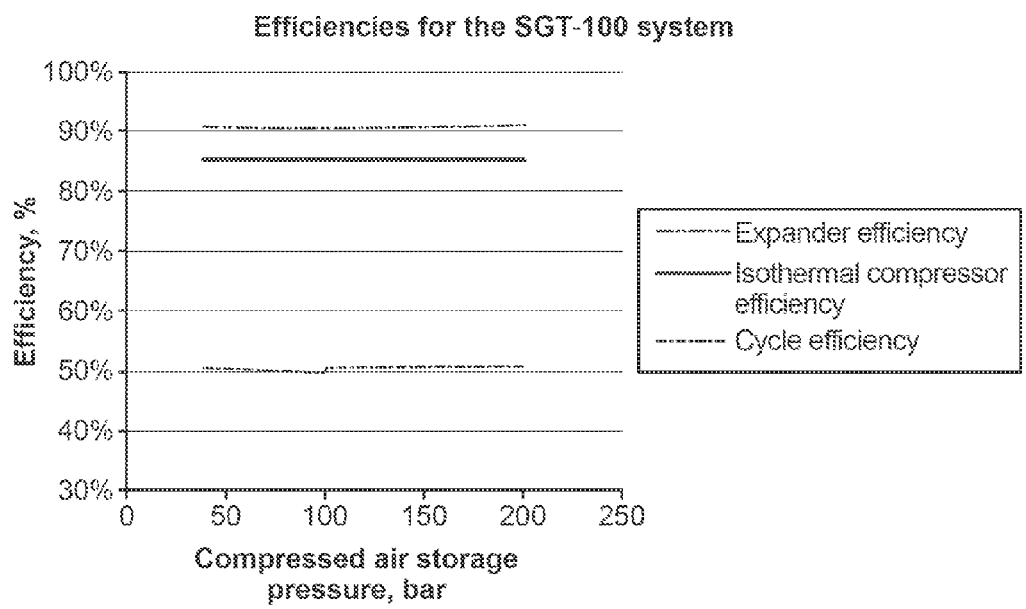
FIG. 6 shows the efficiencies of a system integrating the SGT-100 turbine over the range of air source pressures.

FIG. 6 shows the efficiencies of a system integrating the SGT-100 turbine over the range of air source pressures. The overall cycle efficiency is calculated by subtracting the compression power from the expander power output, and then dividing by the total thermal input.

From FIG. 6 it is seen that the thermal efficiency of the expander system is at or slightly above 90% over the whole range of air source pressures. The overall cycle efficiency is close to 50%.

Modeling of systems integrating the other three gas turbines listed in Table 1, was also performed. Some differences between the different gas turbines resulting from this modeling are now discussed.

Figure 7:
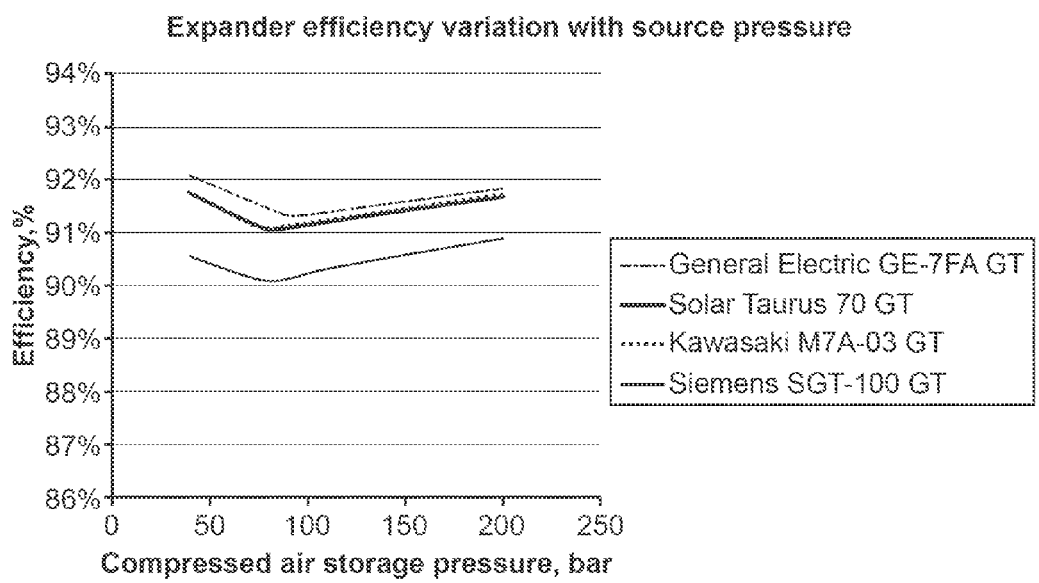
FIG. 7 plots expander efficiency with the four specific gas turbines over the range of air source pressures.

FIG. 7 plots expander efficiency with the four specific gas turbines over the range of air source pressures. It is seen that the efficiency increases from between 90 and 91% for the 5MW SGT-100, to between 91 or 92% for the 8 MW M7A-03 and the Solar Taurus 70. However, little further change in expander efficiency is achieved as the size and power of the gas turbine increases to 216 MW. This is because expander efficiency is already high with the small gas turbines.

Figure 8:
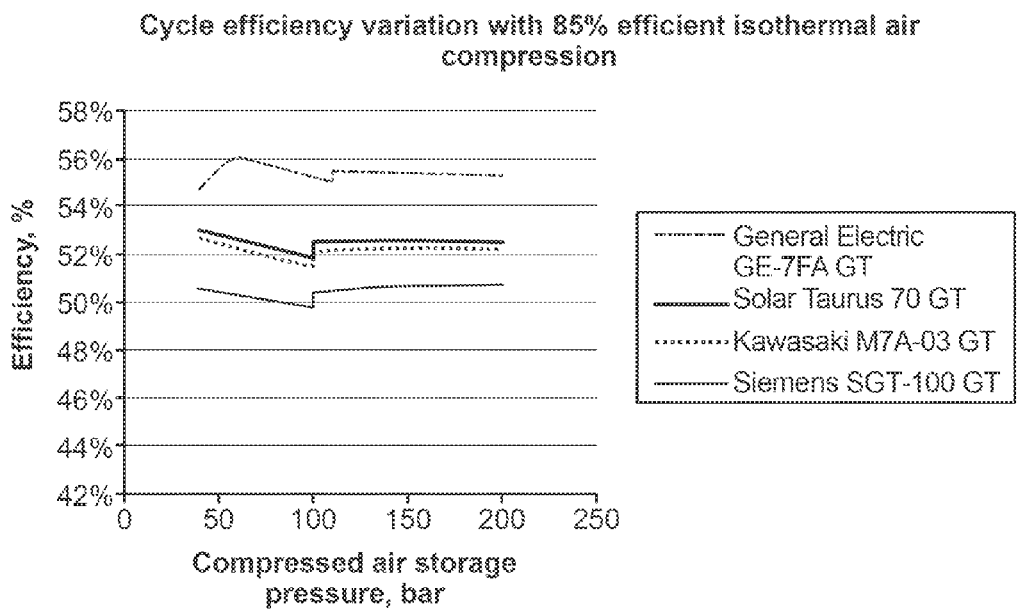
FIG. 8 plots overall cycle efficiency with the four specific gas turbines assuming 85% efficient isothermal compression over a range of air storage pressures.

FIG. 8 plots overall cycle efficiency with the four specific gas turbines over the range of air storage pressures. In contrast with FIG. 7, this plot of overall cycle efficiency reflects a steady improvement as the size and power of the gas turbine increases. It is seen that the overall cycle efficiency is generally in the range of 55 to 56% in the case of GE-7FA gas turbine, whose power output per unit of air flow, is significantly improved.

Figure 9:
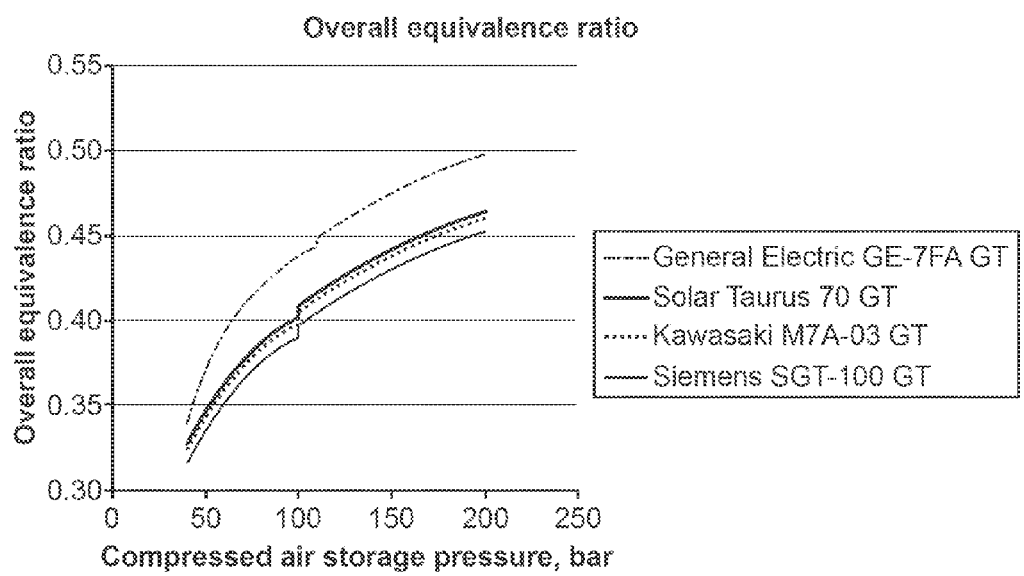
FIG. 9 plots overall equivalence ratio of the expansion system for the four specific gas turbines over the range of air source pressures.

FIG. 9 plots overall equivalence ratio of the expansion system for the four specific gas turbines over the range of air source pressures. This equivalence ratio includes the fuel used in the gas turbine and in both HP and LP burners. There is a significant increase as the size and power of the gas turbine increases.

Figure 10:
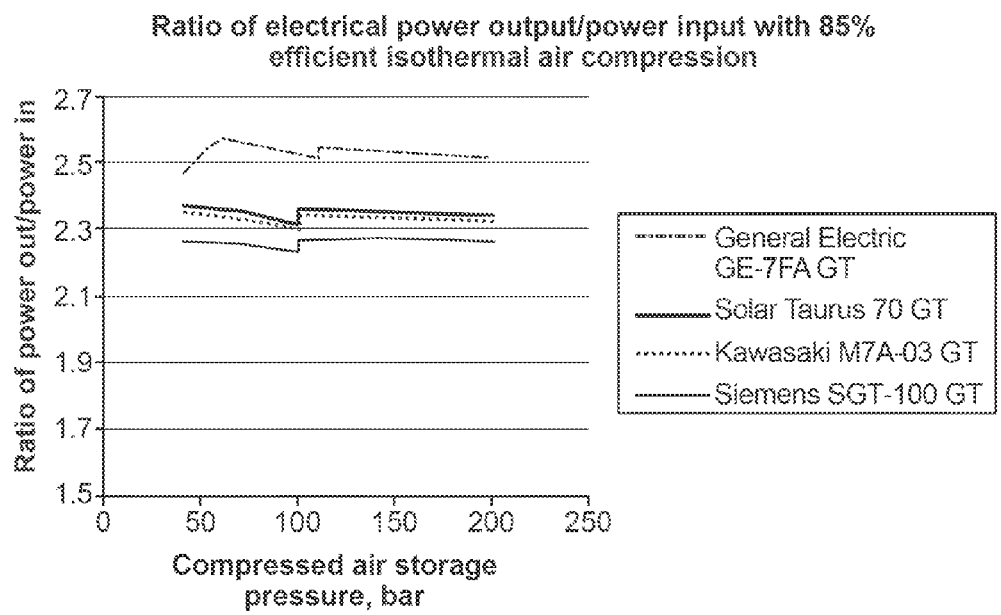
FIG. 10 shows the ratio of electrical power output to input for the four specific gas turbines for the case of 85% efficient isothermal compression.

FIG. 10 shows the ratio of electrical power output to input for the four specific gas turbines. It is seen that this ratio increases for the larger gas turbines which have higher turbine firing temperatures (i.e. the gas temperature at the inlet to the moving blades of the gas turbine), and higher isentropic efficiencies.

Specifically, FIG. 10 shows that the ratio of power output to power input increases substantially in line with the increase in the equivalence ratio. The increase in power output per unit mass of air indicates that the proportion of the expansion power, which is required for compression, is reduced. Therefore the overall cycle efficiency improves, even though there is little increase in the expansion efficiency.

The increase in equivalence ratio is not necessarily related to the size of the gas turbine, since some relevant factors are the gas turbine firing temperature and the isentropic efficiency of the gas turbine expansion. For example, the gas turbine firing temperature is determined by the blade material and by the blade cooling technology, rather than the physical size of the gas turbine. It is noted that the assumed turbine firing temperature of the GE-7FA is about 1300° C. compared to temperatures of 1100 to 1160° C. for the smaller gas turbines.

A high isentropic efficiency may also influence the equivalence ratio since this gives a larger temperature drop for a given pressure ratio. Consequently more fuel can be added in the downstream duct burners. Larger gas turbines tend to achieve higher isentropic efficiencies partly because leakage and other turbine blade end effects are smaller in proportion to the total power output.

The effects of operational conditions on gas turbine and air turbines were also modeled. As previously mentioned, the increase in turbine back pressure due to the downstream heat exchangers causes the gas turbine exhaust temperature to be raised slightly above the standard operating conditions in a simple cycle configuration. This effect is also observed with gas turbines in a conventional gas and steam combined cycle.

Figure 11:
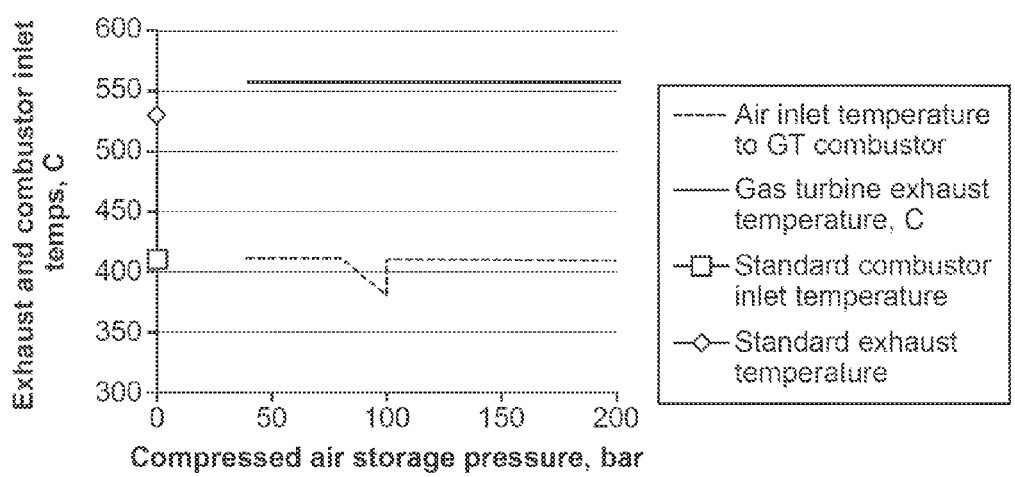
FIG. 11 shows exhaust and combustor inlet conditions for the SGT-100 turbine.

FIG. 11 shows exhaust and combustor inlet conditions for the SGT-100 turbine. FIG. 11 shows that the gas turbine exhaust temperature is increased by about 25° C. It is also seen that the temperature of the air supplied to the gas turbine combustor (and to the blade cooling system) is the same as the standard combustor inlet temperature over nearly all the air source pressure range.

There is, however, a small reduction in this inlet temperature in the pressure range between 80 bar and 100 bar air source pressure. This reduction arises because the HP air turbine is bypassed below 100 bar, so the LP air turbine has a high pressure ratio.

The air inlet temperature to the air turbine is limited to 700° C., so the high pressure ratio causes a reduction in the air temperature leaving the LP air turbine. It is not expected that significant issues would arise from this small reduction in the combustor air inlet temperature.

Figure 12:
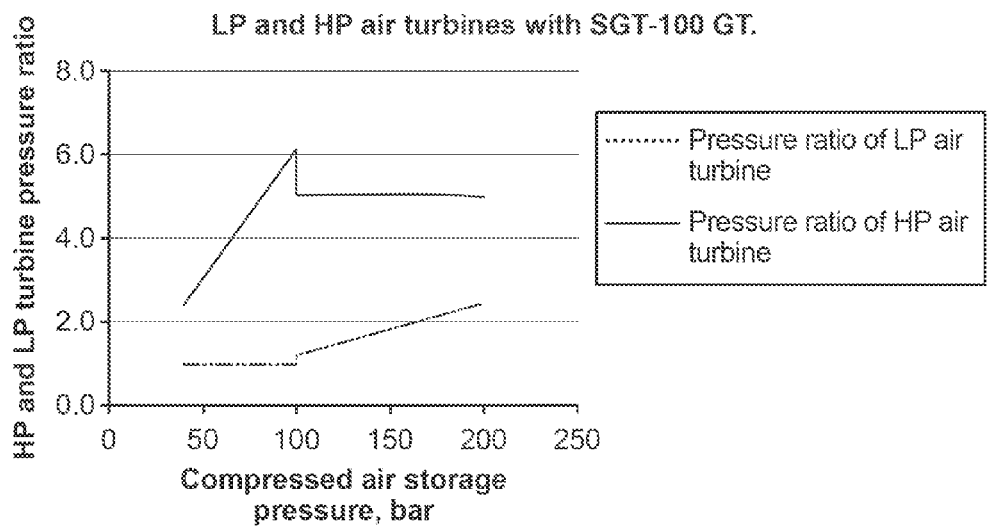
FIG. 12 shows the variation in pressure ratios of HP and LP air turbines with air source pressure of the compressed air source for the case of the SGT-100 gas turbine.

FIG. 12 shows the variation in pressure ratios of HP and LP air turbines with air source pressure of the compressed air source for the case of the SGT-100 gas turbine.

Figure 13:
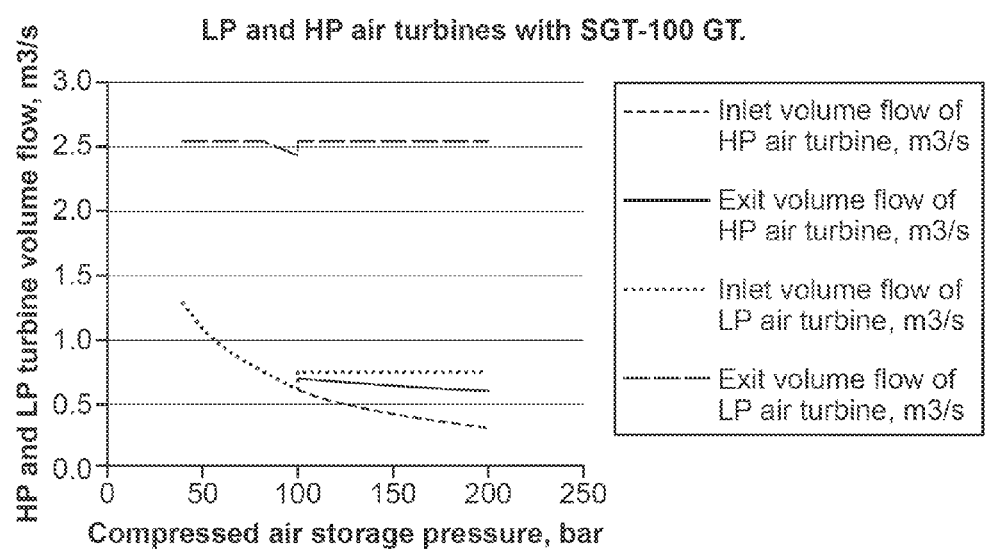
FIG. 13 shows the variation in inlet and exit volume flows through the LP and HP turbines.

FIG. 13 shows the variation in inlet and exit volume flows through the LP and HP turbines. The exit volume flow of the LP air turbine is almost constant, since this matches the inlet volume flow to the gas turbine.

Overall performance of the proposed power cycle may be compared with that of a conventional combined cycle gas turbine (CCGT) having a steam Rankine cycle. The performance of CCGTs is dependent on the size of the plant. This is partly because large gas turbines are more efficient than small ones.

The dependence of CCGT performance on size is also a consequence of the fact that the efficiency of a steam Rankine cycle is dependent on its complexity. In particular, the efficiency of a steam plant used for gas turbine heat recovery is increased if it has three boiler pressures, and if the steam is reheated after expansion in the HP steam turbine. The increased complexity of the steam cycle can only be justified for large plants.

Figure 14:
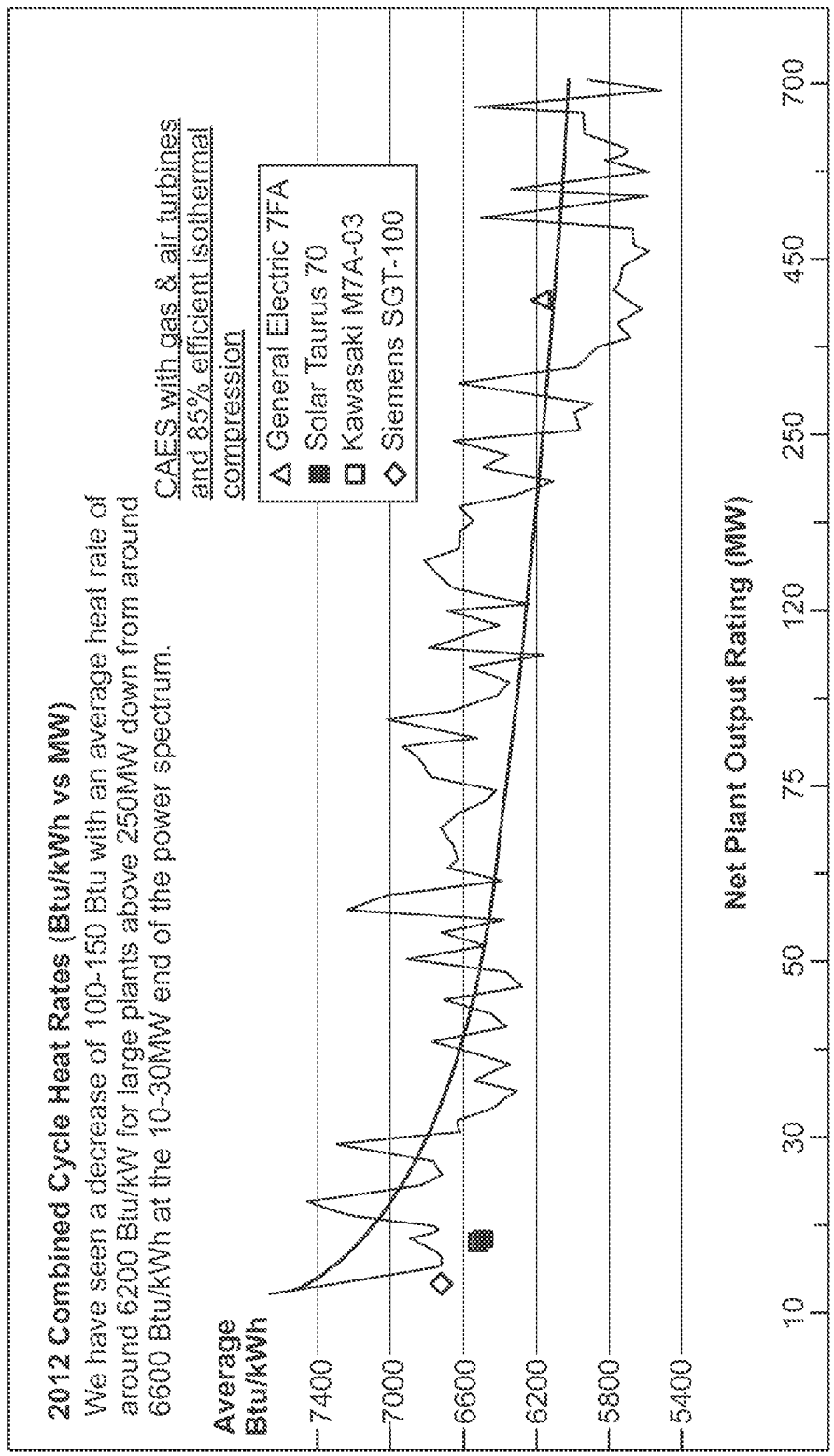
FIG. 14 shows a graph of heat rates (in Btu/kWh) of a combined cycle gas turbine plant versus the rated plant output compared with the heat rate of a CAES system with 85% efficient isothermal compression.

FIG. 14 shows a graph of heat rates (in Btu/kWh) of a combined cycle gas turbine plant, versus the rated plant output. Modeled heat rates of the proposed gas turbine and air turbine plants are also superimposed on the graph. These heat rates refer to the complete cycle including the compression.

FIG. 14 shows the heat rate for the complete cycle involving the General Electric 7FA gas turbine is comparable with corresponding combined cycle gas turbines of similar output. However, the heat rates for cycles involving the three smaller gas turbines are all significantly lower than for the corresponding size of combined cycle systems.

Particular embodiments of the proposed power cycle may be employed to store cheap off-peak energy, which may be provided by renewable energy sources, such as wind. On the other hand, the power obtained from expansion is delivered at such times when the electricity demand is high and power prices are also high.

Thus, if renewable sources are used to provide the off-peak power, then the high expansion efficiency of over 90% allows substantial reduction in the production of carbon-dioxide per kWh as compared to the most efficient combined cycle plants, which in general have an efficiency of about 60%.

1. An apparatus comprising:
a low pressure air turbine configured to be driven by expansion of heated compressed air received from a compressed air heater, the low pressure air turbine further configured to flow expanded air to a gas turbine.

2. An apparatus as in clause 1 wherein the compressed air heater is in thermal communication with a combusted exhaust of the gas turbine.

3. An apparatus as in clause 2 further comprising a duct burner in thermal communication with the compressed air heater and configured to combust an exhaust of the gas turbine with a fuel.

4. An apparatus as in clause 2 further comprising a turbine configured to be driven by an organic fluid heated by the combusted exhaust of the gas turbine according to an organic Rankine cycle (ORC).

5. An apparatus as in clause 1 further comprising a high pressure air turbine configured to be driven by expansion of compressed air received from a high pressure source, the high pressure air turbine further configured to flow expanded air to the compressed air heater.

6. An apparatus as in clause 5 wherein the high pressure source comprises a compressed air storage unit.

7. An apparatus as in clause 6 wherein the compressed air storage unit is configured to receive compressed air from a substantially isothermal air compressor.

8. An apparatus as in clause 5 wherein the high pressure source comprises an air compressor.

9. An apparatus as in clause 8 wherein the air compressor is configured to perform substantially isothermal compression.

10. An apparatus as in clause 5 comprising a mechanism to selectively couple a shaft of the high pressure air turbine with a shaft of the low pressure air turbine.

11. An apparatus as in clause 1 wherein the low pressure air turbine comprises a nozzle vane adjustable to achieve an incidence angle of the heated compressed air on a blade of the low pressure air turbine.

12. An apparatus as in clause 11 wherein a nozzle vane adjusting mechanism is located outside a casing receiving the heated compressed air.

13. A method comprising:
heating compressed air with combusted exhaust of a gas turbine;

causing the heated compressed air to expand and drive a low pressure air turbine; generating electricity from the low pressure air turbine;

flowing expanded air from the low pressure air turbine to the gas turbine; and generating electricity from the gas turbine.

14. A method as in clause 13 further comprising supplying the compressed air from a compressed air storage unit.

15. A method as in clause 13 wherein the compressed air is produced by a substantially isothermal air compression process.

16. A method as in clause 13 further comprising:
supplying the compressed air from a reheated compressed air flow expanded in a high pressure air turbine; and
generating electricity from the high pressure air turbine.

17. A method as in clause 13 further comprising:
driving a turbine with an organic fluid heated by the combusted exhaust of the gas turbine according to an organic Rankine cycle (ORC); and
generating electricity from the turbine.

As discussed above, particular embodiments may rely upon the expansion of gas that has been compressed in conjunction with gas-liquid heat exchange. However, this is not required, and according to certain embodiments gas may be compressed absent such gas-liquid heat exchange, for example under adiabatic conditions.

A compression system may not be isothermal, but may instead be operated in an adiabatic manner with coolers inserted at stages during the compression. One example is a three stage compressor having intercoolers between stages and an aftercooler after the last stage.

Heat from the compressor cooler(s) may be used to supply heat to a steam plant. In some embodiments, such a steam plant may comprise a conventional steam Rankine cycle including a boiler, a turbine and a condenser.

Heat from the compressor may reduce an amount of thermal energy conventionally extracted as steam from points along the steam turbine. Since such extracted heat represents a loss in conventional steam turbines, a reduction in the amount of extracted steam made possible by various embodiments can increase the mass flow to the steam turbines and hence the power output of the steam plant. Thus although the compression is adiabatic (rather than isothermal), embodiments allow power to be recycled from the heat that is given up in the inter- and/or after-coolers of the compressor.

One possible advantage offered by such embodiments is the ability to implement existing technology for the purposes described. That is, designs for adiabatic compressors, intercoolers and for aftercoolers operating within the prescribed temperature and pressure ranges, are proven items of technology and can be readily adapted for use, thereby reducing implementation time and cost.

Another possible advantage offered by embodiments, is economic attractiveness for large scale energy storage systems. In particular, a Compressed Air Energy Storage (CAES) plant according to embodiments could be sited near an existing thermal power plant operating on a steam Rankine cycle.

Such thermal power plants operating on a steam Rankine cycle are common all over the world. Many of these plants have boilers fuelled with pulverized coal or with heavy fuel oil. Some thermal plants burn wood pellets and other forms of biomass.

These steam plants all include systems for heating the boiler feed water prior to entry into the boiler itself. This heating is performed by bleeding some steam from different locations along the steam turbines.

The bled steam is supplied to a system of feed heaters, each of which heats the water to a new temperature determined by the conditions at the locations from which the steam was extracted. The bled steam is condensed in the feed heater and the condensed water is drained off and eventually returned to the condenser.

Typically there are multiple (e.g. seven) sequential feed heaters, one of which may also function as a de-aerator. The temperature of the feed water entering the feed train may be about 30° C. and its temperature on entry to the boiler may be about 260° C.

The water is usually supplied to the first feed heater by an extraction pump which takes water at sub-atmospheric pressure from the condenser and delivers it at a pressure of around 14 bar. The main feed pump is usually situated part way along the feed train. This pump typically increases the water pressure to around 170 bar.

The extraction of steam from the turbines is appropriate where no other available heat at a suitable temperature exists for feed heating. The heat in the exhaust gas from the boiler is mostly consumed in pre-heating the air which is used for combustion.

The residual heat in the exhaust gas may be at too low a temperature to be used for feed-water heating. While it is possible to send cold feed water directly to the boiler without doing any pre-heating, this would significantly reduce the efficiency since it involves using high temperature heat for a relatively low grade heating duty.

The extraction of steam part way along the turbines, reduces the power output delivered by the turbines. However, this approach remains an efficient way of configuring the steam power plant in the absence of any other suitable heat source.

Embodiments are configured to leverage synergy between a conventional air compression system which produces heat at temperatures up to around 260° C. (depending on the compression ratio), and a steam power plant. In particular, the latter could benefit from a heat source at this kind of temperature range.

Another aspect of this synergy is that both the proposed heat source (compressed air) and the heat sink (boiler feed water) utilize fluids with a near-constant specific heat. Thus it is possible to achieve close temperature matching between the source and the sink, with a relatively constant small temperature difference between the two fluids. Such close temperature matching according to embodiments is beneficial to the overall efficiency, since it reduces thermodynamic irreversibility of the system.

By contrast, the temperature matching inside one of the feed heaters is not as optimal, since condensing steam is present on one side of the heat exchanger, and boiler feed water is present on the other side. There, the condensing steam remains at constant temperature until all the latent heat of evaporation is given up, but the temperature of the boiler feed water continues to rise. This causes a substantial change in the temperature difference over the length of the tubing in the feed heater.

Therefore, use of the heat of compression in steam plant feed heating should produce a significant increase in output, since it supplies additional heat to the steam power plant and applies that heat in a more efficient way than a steam plant relying entirely on bleeding steam from the turbines. This increase in steam plant output offsets some of the compression power required, such that the net efficiency of compression is increased. This offers a benefit both in terms of the ratio of the energy output/energy input, and in terms of the efficiency of the CAES system as a whole.

In addition to steam plants involving combustion of coal, oil and biomass, embodiments may also apply to feed water heating of a steam turbine in a nuclear plant. Such plants also use extracted steam to heat the feed water.

In a nuclear plant environment, it would be possible to increase the plant electricity output without changing the reactor thermal input. This may facilitate the granting of a modification to the operating license of the plant.

Another possible benefit resulting from application of embodiments in the context of a nuclear plant, is the continuous operation of the nuclear plant at base load. Accordingly, the facility to use the feed water heating system should be available nearly all the time.

A possible benefit of embodiments derives from the widespread existence of coal, oil, biomass, and nuclear steam plants around the world, and the relatively minor nature of modifications called for to incorporate the additional heat source offered by embodiments. And, most existing steam plants are on land affording enough space to build the CAES plant itself.

Where an existing steam plant is proximate to an underground storage location (e.g. natural formation or artificially created), such a feature can be used for large-scale storage of compressed air. Alternatively, storage of compressed air in manufactured tanks is possible.

As described in detail in the following analysis, in addition to the compression system having multiple stages (here 3) with heat supplied for feed water heating in an existing steam plant, the performance of a conventional multi-stage compression system without feed-water heating, has also been considered. Also considered are apparatuses with a different number of stages (e.g. 4-stage and a 5-stage systems). These compression options are examined in combination with the proposed gas turbine/air turbine expansion system.

Figure 15:
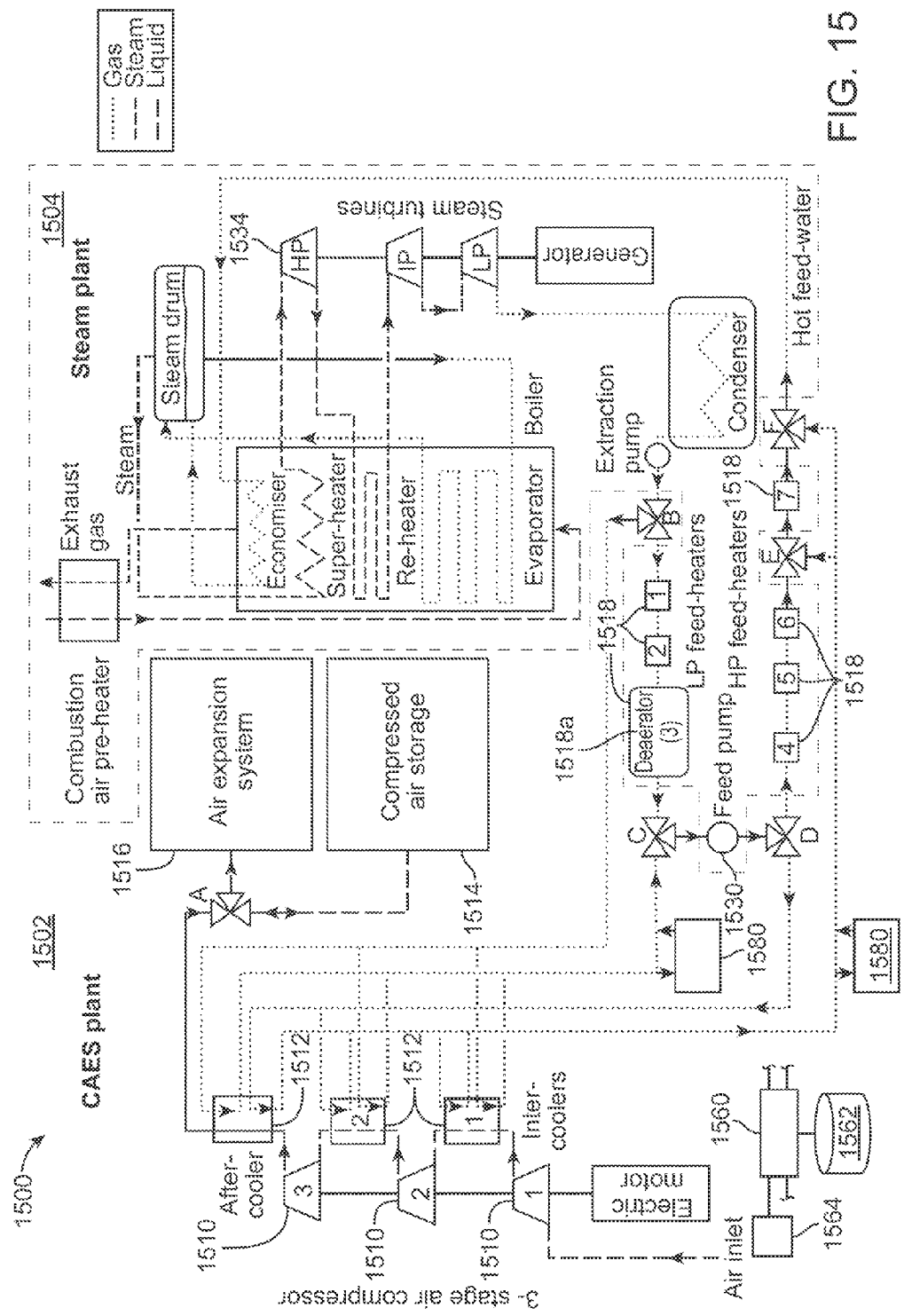
FIG. 15 is a simplified view of a Compressed Air Energy Storage (CAES) system with 3-stage intercooled air compression and steam plant feed heating system according to an embodiment.

FIG. 15 shows a diagram of a system 1500 including a CAES plant 1502 with steam plant feed heating according to an embodiment. The steam plant 1504 is shown within the dashed line. This particular steam plant is assumed to operate at subcritical steam conditions of about 130 bar and 565° C. at the point of entry to the high pressure steam turbine. The part of the diagram which is not inside the dashed line shows three rotodynamic compressors 1510 with their respective intercooler/aftercooler 1512.

FIG. 15 depicts the air storage system 1514 and the air expansion system 1516. The air storage system may comprise above-ground or underground structures. The air expansion system has been described at length previously.

The feed system consists of a total of seven feed heaters 1518. Feed heater 1518a (No. 3) is actually the de-aerator.

All the feed heaters are supplied by extracted steam from the steam turbines. The de-aerator involves direct contact between the extracted steam and the feed water. The other feed heaters do not have direct contact, and the heat transfer occurs through the walls of the tubing containing the boiler feed water.

Feed heaters Nos. 1-3 comprise the low pressure section of the feed heating system, since the water pressure is derived from the extraction pump. After leaving the de-aerator, the feed water goes to the main feed pump where the pressure is increased to around 170 bar.

The feed water heaters Nos. 4-7 comprise the high pressure feed heating system. The particular embodiment of FIG. 15 includes a valve (B) which allows extraction of water immediately after the extraction pump.

The extracted water flows around low pressure pipework supplied to the intercoolers and aftercooler of the air compression system. It is returned to another valve (C) located immediately downstream of the de-aerator.

Valve D is inserted immediately downstream of the feed pump. The purpose of valve D is to extract high pressure feed water, and supply it to each intercooler and to the aftercooler.

It is noted that the direction of water flow in the intercoolers and aftercooler is in counter-flow relative to the direction of the air flow. It is also noted that the HP feed water is supplied to the hotter part of each intercooler and aftercooler. Conversely, the LP feed water is supplied to the colder part of each intercooler and aftercooler. This arrangement maximizes the heat transfer efficiency of the system.

FIG. 15 shows that the HP feed water can be returned to valve E or to valve F. When the pressure in the air storage system is high, the pressure ratios of each of the compression stages is increased, and the temperature of the air and of the heated feed water is also increased.

The embodiment shown in FIG. 15 includes the flexibility to return the HP feed water to the feeds system either via valve E or via valve F depending upon the current compression pressure. When the pressure in the compressed air storage system is high (typically above about 100 bar), the HP feed water is returned via valve F. Conversely, at low air storage pressures, the pressure ratios are low and the temperature of the returned feed water is relatively low. In this case, it is beneficial to use extracted turbine steam in feed heater No. 7 to boost the temperature further. Thus when the pressure in the compressed air storage system is relatively low (typically below about 100 bar), the HP feed water is returned via valve E.

The actual flow rate of extracted LP and HP feed water is determined by the air flow rate of the compression system. The aim of the system is to maintain a near-constant temperature difference between the air and the water in the intercoolers and aftercooler.

In certain embodiments this can be done automatically by measuring the inlet and outlet temperatures of the intercooler and aftercooler and adjusting the flow rates accordingly. The flow rate of extracted steam from the turbine is controlled by the condensation rate in the feed water heaters. No external control of this steam flow rate is needed.

Thus if the flow of feed water through a particular feed heater is reduced, then the amount of steam which can be condensed is also reduced, and the flow of extracted steam is reduced. Accordingly, no control of the steam extraction rate is required.

The extraction of part of the LP and HP feed water would be done when the air compression plant is in operation. At other times, the steam plant could operate as designed with all the necessary steam extraction required for feed water heating. If the air compression plant is required to operate when the steam plant is not in operation (not an issue for base line plants such as nuclear), then the heat from the intercoolers and aftercooler could be dumped elsewhere. The steam plant cooling water system could be a convenient heat sink for this purpose.

An extension to the arrangement shown in FIG. 15, provides for optional thermal storage 1580 (e.g. in an insulated tank) of feed water previously heated in the intercoolers and aftercooler. In such embodiments, the heat from the CAES system could be utilized later when the steam plant resumes operation.

A computer model of the steam plant shown in FIG. 15 was created. The computer model represents the seven feed water heaters (including one deaerator) as shown in FIG. 15. The main feed pump 1530 of the steam plant can be directly driven by a boiler feed pump turbine using steam extracted from the exit of the HP steam turbine 1534. The boiler feed pump turbine is not shown in FIG. 15, but is included in the model.

The high pressure, intermediate pressure, and low pressure steam turbines are also modeled with representative steam turbine isentropic efficiencies. The steam plant itself is modeled in some detail, but the boiler is represented very simply in terms of a thermal input and a boiler efficiency.

The parameters used for the modeling of the steam plant are based on those for an actual steam power plant which is currently in operation in the United Kingdom. Table 3 below shows certain parameters for modeling of the steam plant in the present analysis.

| INPUT PARAMETERS | |
|---|---|
| Condenser pressure (millibar) | 37 |
| Feed water heater 1 steam extraction pressure (bar abs) | 0.4 |
| Feed water heater 2 steam extraction pressure (bar abs) | 0.8 |
| Deaerator/feed water heater 3 steam extraction pressure (bar abs) | 1.7 |
| Feed water heater 4 steam extraction pressure (bar abs) | 4.2 |
| Feed water heater 5 steam extraction pressure (bar abs) | 4.3 |
| Feed water heater 6 steam extraction pressure (bar abs) | 9.2 |
| Feed water heater 7 steam extraction pressure (bar abs) | 31 |
| Feed water temperature at the exit of feed water heater No. 7 (° C.) | 237 |
| Boiler inlet pressure (bar abs) | 146 |
| Superheater outlet pressure (bar abs) | 130 |
| Superheater outlet temperature (° C.) | 566 |
| Reheater exit pressure (bar abs) | 31 |
| Reheater exit temperature (° C.) | 565 |
| Total boiler thermal input (MWth) | 785 |
| Boiler efficiency (%) | 88% |
| Feed pump delivery pressure (bar abs) | 170 |
| Boiler thermal input (MWth) | 785 |
| Feed pump outlet temperature (° C.) | 117 |
| HP steam turbine inlet pressure (bar abs) | 123 |
| IP steam turbine inlet pressure (bar abs) | 30 |
| LP steam turbine inlet pressure (bar abs) | 4.4 |
| OUTPUT PARAMETERS | |
| Feed pump mass flow (kg/s) | 245 |
| Generator electrical power output (MWe) | 304 |

Table 3 also shows certain output parameters, which are calculated by the analysis spreadsheet. In this calculation, the thermal input to the boiler is taken as an input parameter, and the feed flow rate is taken as an output parameter. This is done to determine the effect on the power output of external feed water heater heating, on the basis of an unchanged thermal input to the boiler.

For the purpose of making the comparison, the input parameters of the steam plant shown in Table 3 and the assumed efficiencies of the turbines and pumps were maintained constant. Water and steam flow rates through the feed heaters were changed as a direct result of the diversion of some of the LP and HP feed water to the intercoolers and aftercooler. The electrical power output of the generator is a key output parameter, since changed electrical output shows how much benefit is obtained from the external feed water heating.

Calculations of air compression system performance were performed for an expansion system including the Siemens SGT-100 gas turbine, which has an air mass flow of 20.235 kg/s. In this case, the heat supplied to the steam plant feed heating system is a small fraction of the total feed heating required.

Calculations have also been performed for an expansion system including the General Electric GE-7FA, which has an air flow of 519.4 kg/s. This is more than ×25 larger than the air mass flow of the Siemens SGT-100. The heat of compressing this quantity of air up to a pressure of 200 bar is nearly twice as much as the total feed-heating required by the steam plant modeled.

In this case, it is assumed that the compression heat would be supplied to two units of the steam power plant. Many large steam power plants have multiple identical generating units on the same site. Therefore it would be feasible to have a large CAES plant with a large gas turbine supplying feed water heating to two or more units of an existing steam plant.

For the purpose of the present calculation considering a single unit of the steam power plant, it is assumed that the air flow is 259.7 kg/s, which is half the air mass flow of the GE-7FA. However, this example is merely an illustration, and other embodiments may be configured to work with a gas turbine having an air flow corresponding to the feed heating duty of a single unit of the specific steam power plant.

Table 4 below, shows the input data and results of two of the calculations performed for the air compression and steam plant system illustrated in FIG. 15.

| | Low flow | High flow |
|---|---|---|
| INPUT PARAMETERS | | |
| Compressed air mass flow (kg/s) | 20.235 | 259.7 |
| Number of compression stages | 3 | 3 |
| Compressor motor efficiency (%) | 98% | 98% |
| 1st stage pressure ratio | 7.5 | 7.5 |
| 2nd stage pressure ratio | 5.389 | 5.389 |
| 3rd stage pressure ratio | 5.27 | 5.27 |
| 1st stage compressor polytropic efficiency | 88% | 92% |
| 2nd stage compressor polytropic efficiency | 88% | 92% |
| 3rd stage compressor polytropic efficiency | 88% | 92% |
| LP feed return temperature (° C.) | 115 | 115 |
| Return HP feed to boiler inlet (option 1), or to last feed heater (option 2) | 1 | 1 |
| Heat exchanger air-water temperature difference (° C.) | 20 | 20 |
| OUTPUT PARAMETERS | | |
| Compressor discharge pressure (bar abs) | 200 | 200 |
| % change in feed pump flow rate from base case | 0.1% | −0.44% |
| LP feed extraction & return to feed pump inlet (kg/s) | 15.7 | 201.3 |
| HP feed extraction flow rate (kg/s) | 14.9 | 193.1 |
| External LP feed heating (MWth) | 5.7 | 73.5 |
| External HP feed heating (MWth) | 9.2 | 107.6 |
| Compression gross electrical power input (MWe) | 15.3 | 185.8 |
| Steam plant generator power increase compared to base case (MW) | 3.6 | 41.0 |
| Net compression electrical power input (MWe) | 11.7 | 144.8 |
| Net compression efficiency relative to ideal isothermal compression (%) | 74.9% | 78.0% |
| Gross compression efficiency relative to ideal isothermal compression, (%) | 57.3% | 60.8% |
| Compressor power saving by use of external feed heating (%) | 23.5% | 22.0% |
| Conversion efficiency of heat transferred to steam plant (%) | 24.1% | 22.6% |

The first example is for an air flow of 20.235 kg/s, which corresponds to that of the SGT-100 gas turbine. The second example is for an air flow of 259.7 kg/s.

Both examples refer to a 3-stage compression system operating at the proposed maximum pressure of 200 bar abs. The pressure ratios of the three stages are chosen so that the outlet temperatures of the intercoolers and the aftercooler are approximately the same. The $1^{st}$ stage pressure ratio is always the highest, since the inlet temperature to the compressor is that of the ambient air, which is assumed to be at 1.013 bar and 15° C. The air inlet temperatures of the following compression stages is about 48° C., because of temperature drops in the heat exchangers and because all the compression heat is being transferred to the boiler feed water.

The efficiencies of the air compressors are specified in terms of the polytropic efficiency, as this is a good indicator of the aerodynamic performance and is relatively constant over a wider range of pressure ratios. The isentropic efficiency of the compressors is lower and varies with the pressure ratio.

In the low flow case shown in Table 4, the compressor isentropic efficiencies vary between 84.3% and 84.9%. Clearly, the compressors for a system incorporating a large gas turbine such as the GE-7FA would be larger, and it is expected that the compressor polytropic efficiencies would be higher.

Based on the estimated efficiencies of the original gas turbines, it is assumed that the polytropic efficiency of the air compressors of a large CAES system would be 92%. The corresponding isentropic efficiencies are between 89.5% and 90%. Other parameters shown in the input data section of Table 4 (apart from the polytropic efficiencies and the air mass flow) are unchanged between the low mass flow and the high mass flow cases.

As indicated in FIG. 15, there are two possible options for the location of the return of the heated HP feed-water. The computer model of the system includes both.

Specifically when the air reservoir pressure is above about 100 bar, it may be desired to return the hot feed water to a point just upstream of the boiler entry. Below this pressure it may be desired to return hot feed water to a point upstream of the last feed heater.

The additional power derived from the steam power plant in the low flow case amounts to 3.6 MWe, which is small relative to the steam plant power output. However, it represents a significant proportion of the gross power used for the compression process.

For this example, Table 4 shows that 23.5% of the gross compression power can be recovered in this way. It is also seen that the efficiency of conversion of the heat from the intercoolers and aftercoolers to electric power is 24%, which is good considering the relatively low temperature of the supplied heat.

A useful way to assess the overall performance of the complete compression system is to define a compression efficiency by the ratio of the power consumption of an ideal isothermal compressor, to that of the actual compression system. Using this definition, the efficiency of the proposed compression system as calculated in the present low flow example shown in Table 4 is 74.9%. Without the power recovery by heating the feed water of the steam plant, the compression efficiency of the 3-stage system would be only 57.3%.

In the high flow example, the compression efficiency relative to perfect isothermal compression is predicted to be 78%. The corresponding compression efficiency in the absence of the steam plant feed heating would be 60.8%. These efficiencies vary with the final pressure of the system and the number of stages assumed. Results of additional calculations are shown below.

The calculated compression efficiency relative to ideal isothermal compression is also useful for the purpose of calculating the performance of the complete CAES system, including both the air compression system and the gas turbine/air turbine expansion system. The compression efficiency derived from the air compression calculation is simply input to the calculation of the expansion system to determine the overall performance.

Figure 16:
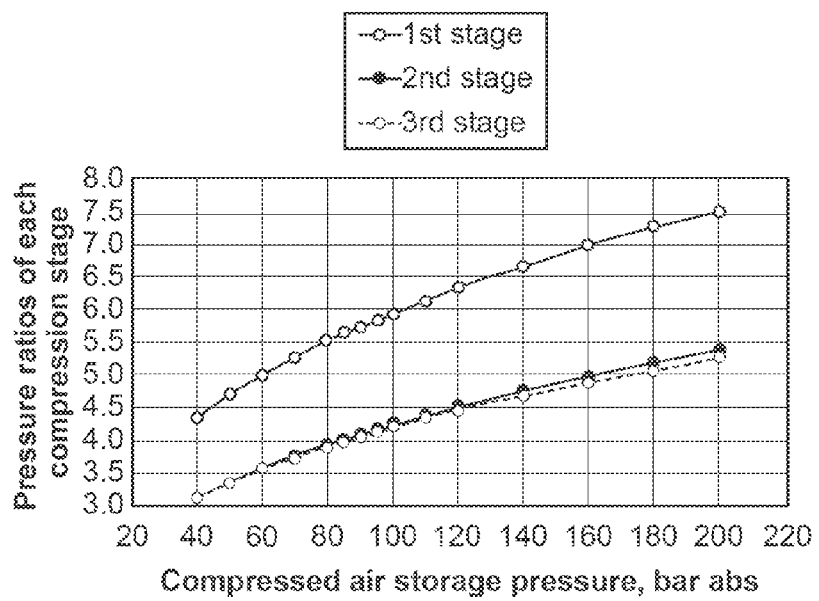
FIG. 16 plots pressure ratios of each stage in a three-stage intercooled compression system according to an embodiment.

FIG. 16 shows the variation of the pressure ratios of the three compression stages over the range of air reservoir pressures from 40 bar up to 200 bar. This variation applies to both the small and large air mass flow examples. Pressure ratios may be adjusted by variable inlet guide vanes, rather than by varying the motor speed.

Figure 17:
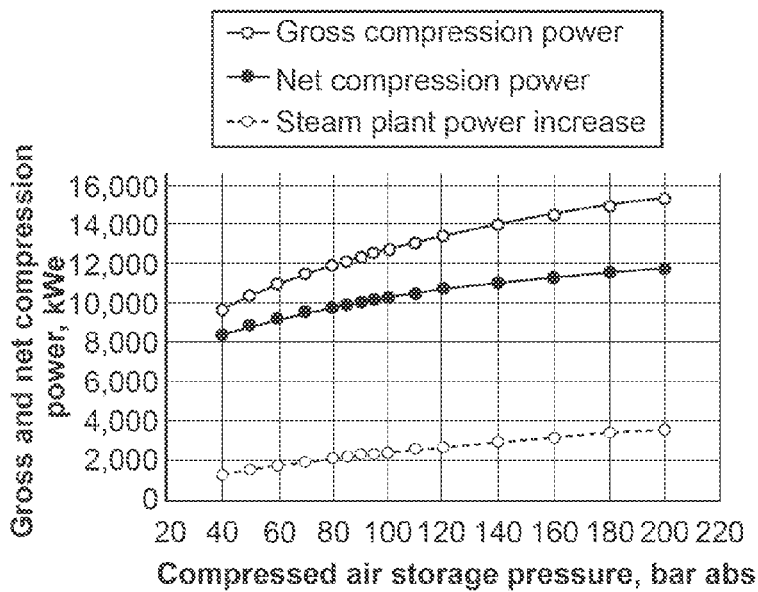
FIG. 17 plots gross and net compression power for a constant air mass flow of 20.235 kg/s in a 3-stage intercooled compression system according to an embodiment.
Figure 18:
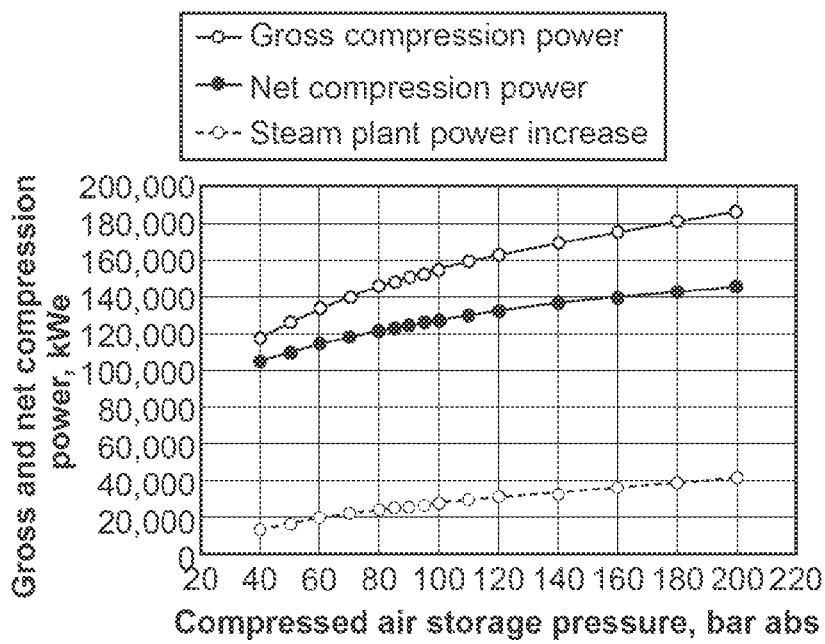
FIG. 18 plots gross and net compression power for a constant air mass flow of 259.7 kg/s in a 3-stage intercooled compression system according to an embodiment.

FIG. 17 and FIG. 18 show the gross and net compression power for the small and large air flow cases respectively. It is seen that the variation in the net compression power with the air storage pressure is reduced by the contribution from the steam plant.

Figure 19:
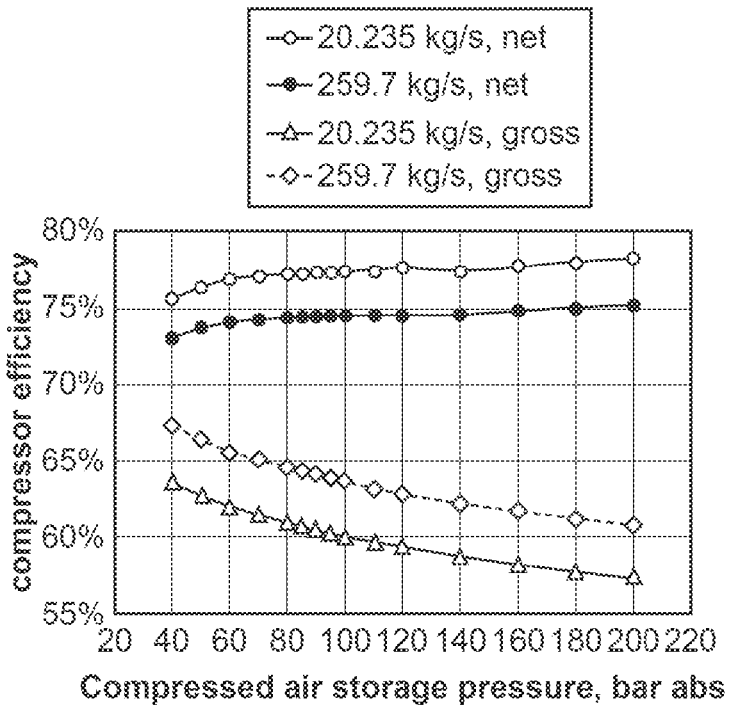
FIG. 19 plots gross and net compression efficiency of a 3-stage intercooled compression system relative to ideal isothermal compression.

FIG. 19 shows the gross and net compression efficiency relative to an ideal isothermal compressor over the proposed range of operating pressures of the CAES system. Both the low flow and high flow cases described in Table 5 are included.

It is seen that the net compression efficiency, which takes account of the power recovery in the steam plant, is fairly constant over the entire range of pressures. The gross compression efficiency on the other hand reduces as the air reservoir pressure increases. This occurs because the temperature of the compressor exit air increases as the reservoir pressure increases.

Figure 20:
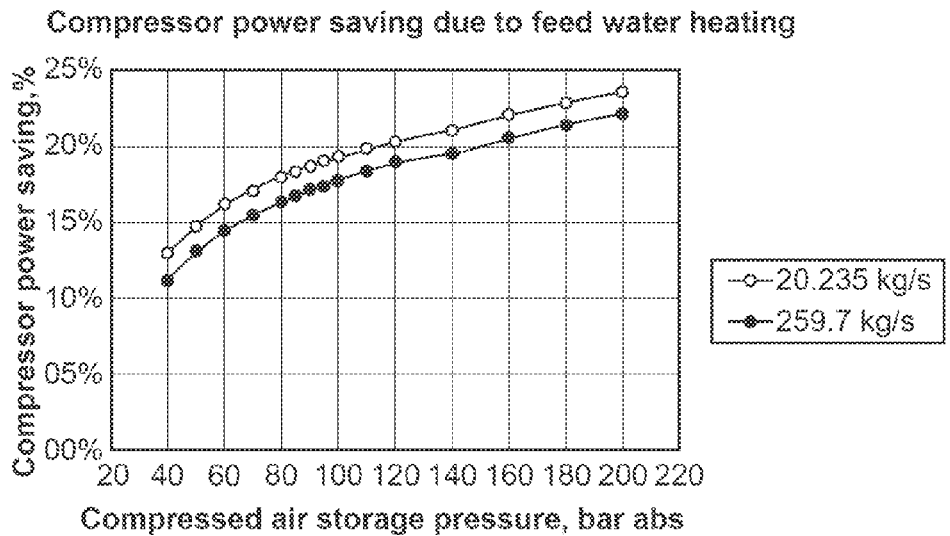
FIG. 20 plots compression power saving due to feed water heating of the steam plant according to an embodiment.

FIG. 20 shows the fraction of the compression power that can be saved by feed water heating of the steam plant. The average power saving at 20.235 kg/s is 19.9%. The average power saving at 259.7 kg/s is 18.4%.

It is possible to reduce the gross compression power by increasing the number of compression stages. This option can be compared with the options discussed above.

Figure 21:
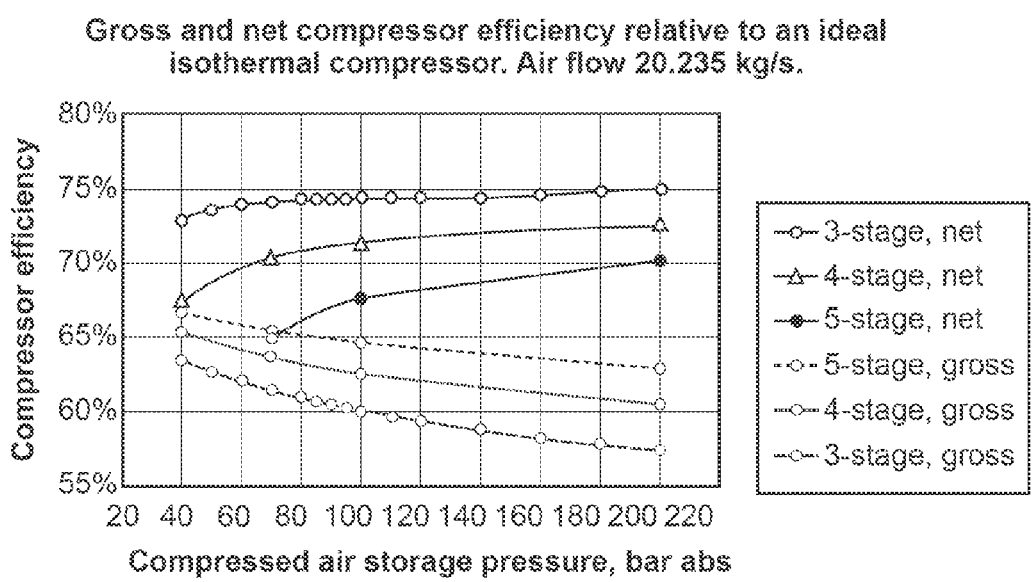
FIG. 21 plots gross and net compressor efficiency for 3-, 4- and 5-stage air compression according to embodiments.

FIG. 21 shows the variation in gross and net compression efficiency relative to ideal isothermal compression over the range of air storage pressures. This shows that a 3-stage system is suited for the situation where the compression heat is transferred to a steam plant feed heating system.

FIG. 21 also shows that a 5-stage system is the most efficient of these options, if the compression heat is simply dissipated. However, there can still be a substantial advantage of a 3-stage system with recovery of compression heat, as compared to a 5-stage system without heat recovery.

Performance of the combined system of air compression with steam plant feed heating and gas turbine/air turbine expansion is now assessed in various ways. One approach is to consider the ratio of energy output to energy input, represented by the parameter R.

In a pure energy storage system, R is inevitably less than unity because of various energy losses. However, if the expansion system involves heating by combustion of a fuel then R can be significantly larger than unity.

Expansion efficiency ($\eta_{exp}$) is defined as the electrical output of the expansion system divided by the lower heating value (LHV) of the fuel consumed. This efficiency takes no account of the energy consumed in compressing the air. It is concerned with the thermal energy consumed and the power generated by the expansion.

An overall cycle efficiency ($\eta_{cycle}$) can also be defined. This is the ratio of the net electrical energy generated (determined by subtracting the electrical energy consumed during compression), divided by the thermal energy consumed in the expansion.

The three parameters defined above are not independent, but are related by the following equation:

$$\eta_{cycle} = \eta_{exp}(1 - 1/R)$$

Because of this relationship, only two of these three parameters need to be chosen in order to characterize the overall performance. The cycle efficiency ($\eta_{cycle}$) indicates the overall thermodynamic efficiency, while the ratio R indicates the ratio of recovered energy to the stored energy.

The above equation also shows that the overall efficiency of the cycle is partly determined by the value of R. The cycle efficiency is significantly enhanced if the value of R is increased, even if there is no change in the value of the expansion efficiency ($\eta_{exp}$).

The overall cycle efficiency ($\eta_{cycle}$) can be compared directly with the cycle efficiency of power generation cycles, such as the open-cycle gas turbine (OCGT) and combined cycle gas turbine (CCGT), conventional steam Rankine cycles, and diesel engine cycles. Such comparisons take no account of the fact that the CCGT and other conventional power generation cycles have no way of storing energy, and cannot make use of externally produced electrical energy (such as from intermittent renewable sources). So, the parameter R is not applicable to these systems.

Figure 22:
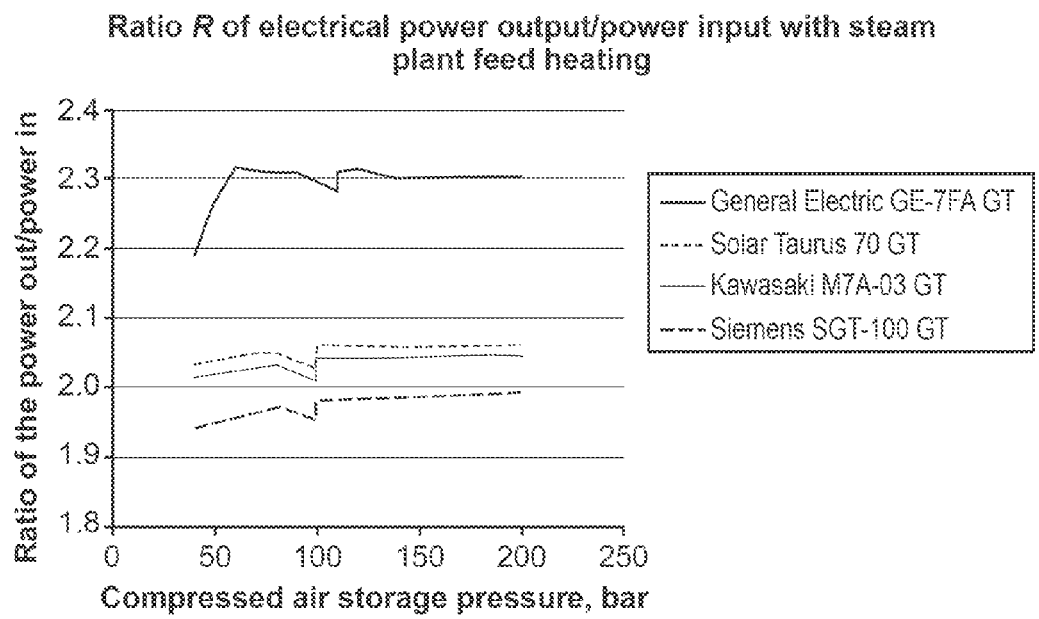
FIG. 22 plots the ratio R of energy output/energy input with steam plant feed heating.
Figure 23:
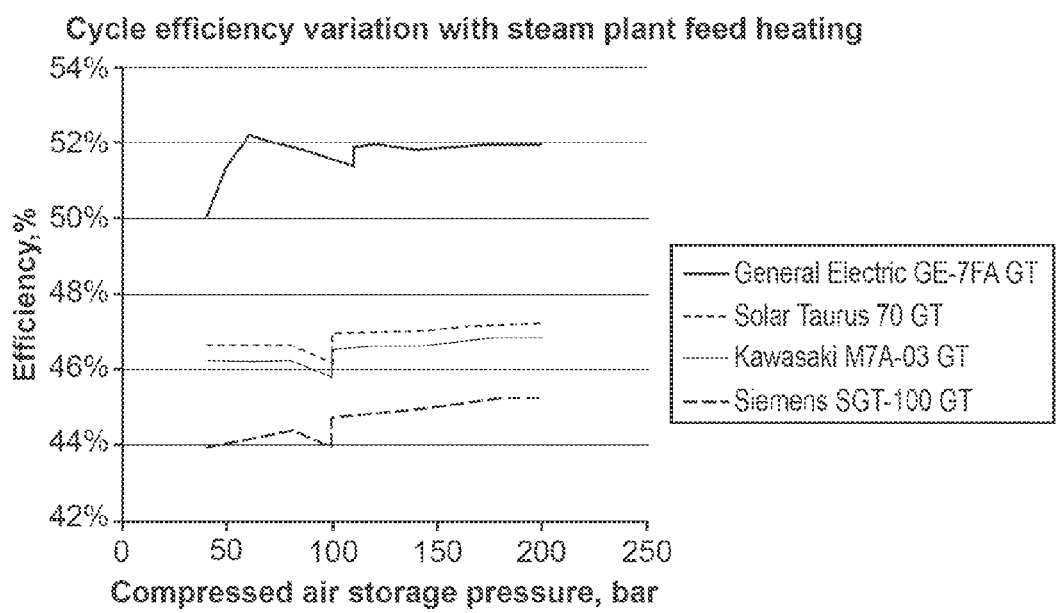
FIG. 23 shows cycle efficiency variation with steam plant feed heating according to an embodiment.

FIG. 22 shows that the ratio R of energy output/energy input for the proposed system with steam plant feed heating is between 1.9 and 2.1 for the three smaller gas turbines, and is around 2.3 for most of the pressure range in the case of the GE-7FA. FIG. 23 shows the corresponding cycle efficiency with steam plant feed heating.

It is seen that the overall efficiency of the proposed systems incorporating the smaller gas turbines is between 44% and 47%. By contrast, the overall efficiency of the system using the much larger GE-7FA is near 52% over most of the pressure range. These efficiencies are higher than the corresponding open-cycle gas turbine efficiencies, which are 31.0%, 34.1%, 34.3% and 38.6% for the SGT-100, M7A-03, Taurus 70 and GE-7FA respectively.

One reason for the improved efficiency relative to the open-cycle system, is that the proposed expansion system involves recuperation of the exhaust heat. The open-cycle gas turbine has no recuperation and no other form of heat recovery in the exhaust gas and the overall thermal efficiency is limited by this fact.

Data on the heat rates of a large number of combined cycle gas turbines was previously shown in FIG. 14 and compared with a gas turbine/air turbine expansion system working in combination with an isothermal air compression system. This heat rate is an alternative way of representing the cycle efficiency. The heat rate in Btu/kWh is equal to $3412/\eta_{cycle}$.

Figure 24:
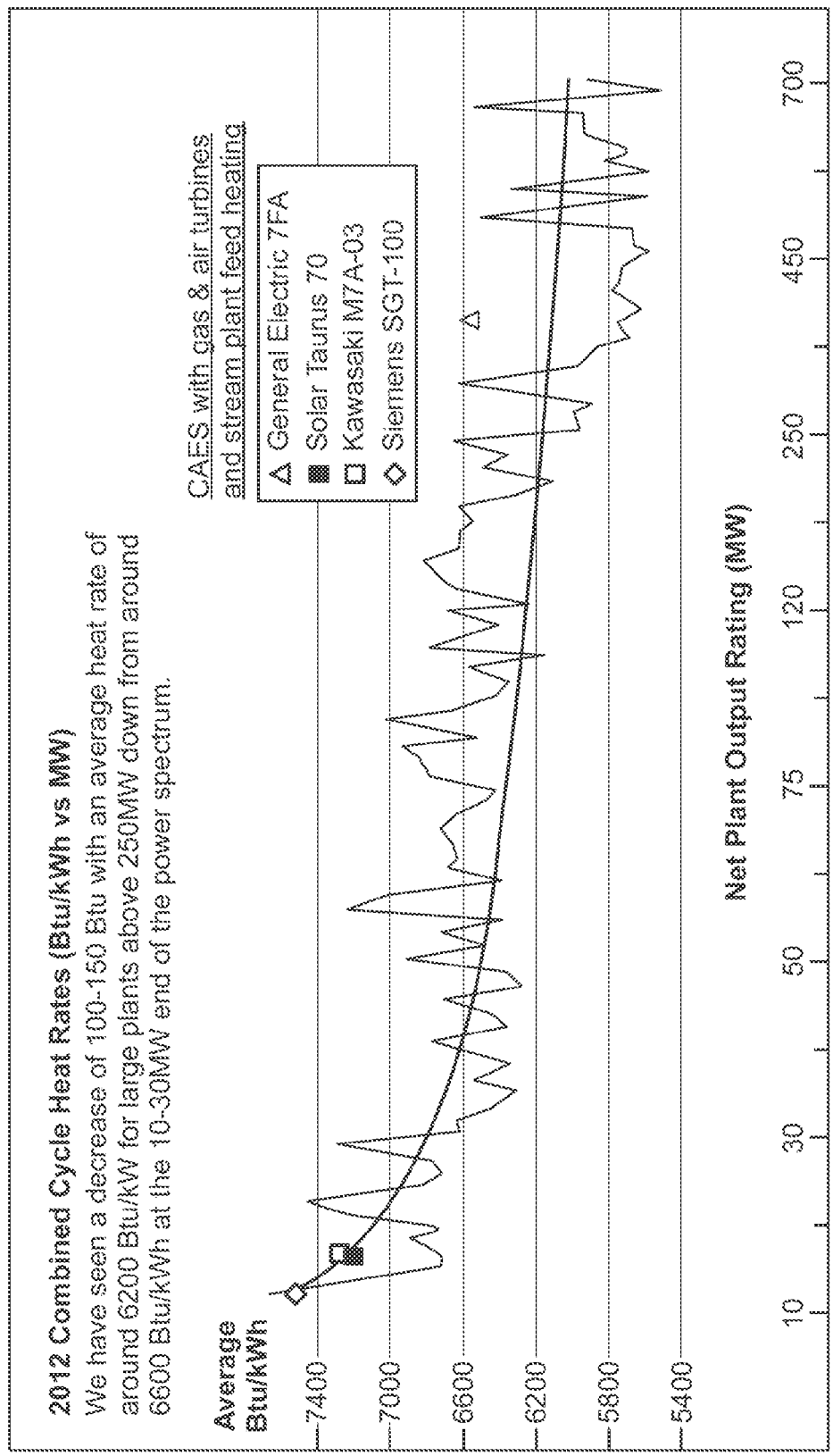
FIG. 24 shows a graph of heat rates (in Btu/kWh) of a combined cycle gas turbine plant versus the rated plant output compared with the heat rate of a CAES system with steam plant feed heating.

FIG. 24 shows that the predicted heat rate (or cycle efficiency) of the proposed system involving an intercooled compression plant with steam plant feed heating and incorporating any of the three smaller gas turbines is similar to what would be expected of a combined cycle power plant of similar output. In the case of the GE-7FA, the heat rate of the proposed energy storage system is about 7% higher than might be expected of a similar size of CCGT.

Disclosed in the Publication (referenced and incorporated earlier above), is a compression and expansion energy storage system utilizing gas-liquid heat exchange. A target efficiency of such a quasi-isothermal compression system may be 85% relative to ideal isothermal compression. Thus it is of interest to include an 85% efficient quasi-isothermal compressor in comparison with the various alternative systems discussed herein.

Figure 25:
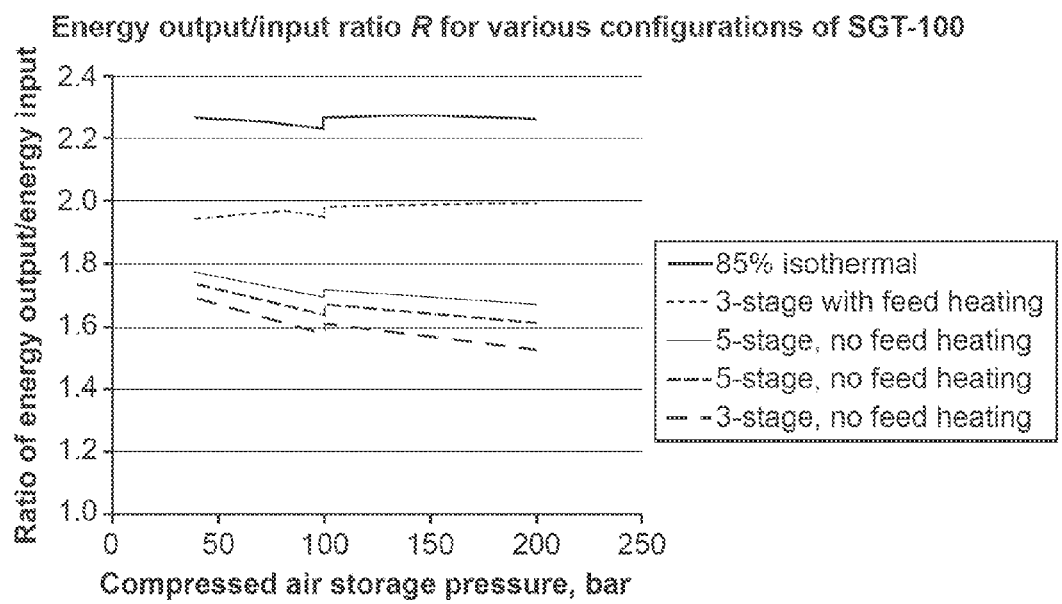
FIG. 25 is a plot comparing the energy output/input ratio R for various compression options combined with an SGT-100 expansion system.
Figure 26:
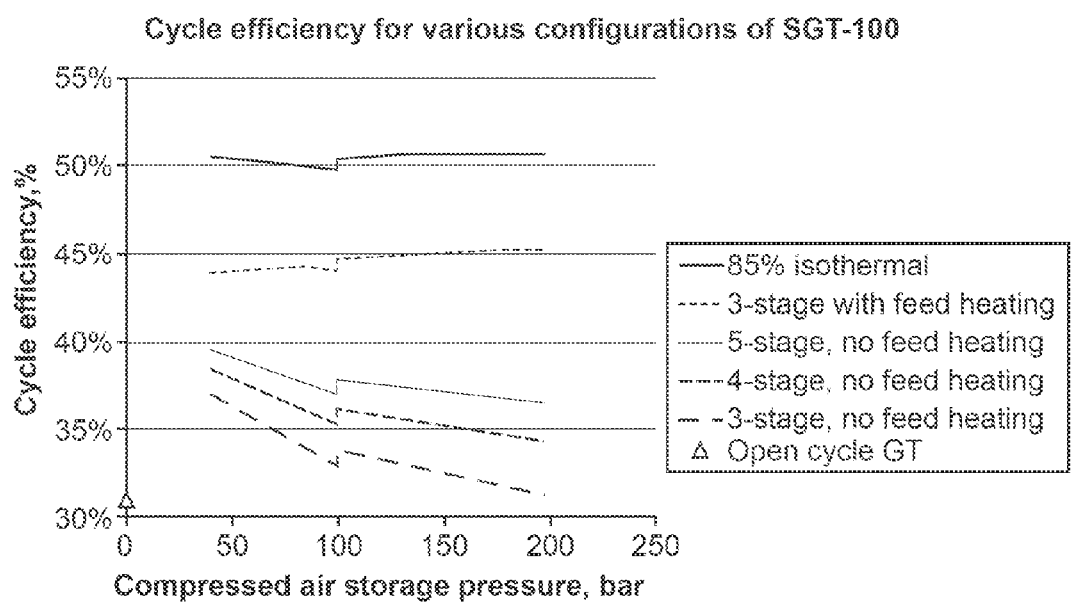
FIG. 26 plots cycle efficiency for the SGT-100 expansion system combined with different compression systems.

FIG. 25 shows comparisons of the energy output ratio R for an expansion system based on the SGT-100 combined with various compression options. FIG. 26 shows the corresponding comparison of the overall cycle efficiency; the open-cycle efficiency is also shown.

It is seen that an 85% efficient isothermal compressor would give the best performance, followed by the 3-stage compression system with steam plant feed heating. The performance of the 5-stage compression system (without feed heating) has an overall cycle efficiency of around 37%, which is well above the 31% efficiency of the open-cycle system but some way below the efficiency of about 44% for the 3-stage compression system with feed heating.

In summary, particular embodiments relate to a compressed air energy storage system involving multiple stages of conventional compression, in which the heat of compression is transferred into the feed system of a pre-existing steam plant. The compressed air is delivered to a compressed air storage system capable of operating within a pressure range (e.g. between about 40-200 bar).

The heat delivered to the feed system of the steam plant, reduces the quantity of steam extracted from the steam turbines for feed-heating purposes. This results in an increase in the output of the steam plant, which offsets part of the power required to compress the air. The average compression power saving over the range of storage pressures can be in the range of about 20%.

Operation of the steam feed system and the cost of storage are now discussed. An embodiment of a system combining air compression with steam plant feed heating, air storage, and enhanced energy recovery by combustion of fuel, can perform both energy storage and power generation functions.

The operation of the system can be flexibly biased towards either of these functions, depending on prevailing economic drivers. Three possible modes of operation are envisaged.

First, the system may operate in energy storage mode using the compression system to charge up the air reservoir. Second, the system may operate in energy recovery mode using the expansion system and consuming air from the air reservoir.

Third, the system may operate in a steady-state generation mode, using both the compression system and the expansion system, but with no air being added to or taken from the compressed air store. The operating pressure of the system during this mode of operation may be different from the current pressure in the compressed air store.

Table 5 shows an example of a method of operating the proposed CAES system.

|  | Gas turbine | | | |
| --- | --- | --- | --- | --- |
|  | SGT-100 | M7A-03 | Taurus 70 | GE7-FA |
| Air flow rate (kg/s) | 20.235 | 26.9 | 26.6 | 519.4 |
| Storage duration (hours) | 8 | 8 | 8 | 8 |
| Steady-state generating duration (hours) | 8 | 8 | 8 | 8 |
| Energy recovery (hours) | 8 | 8 | 8 | 8 |
| Volume of each storage unit (m3) | 10 | 10 | 10 | 10 |
| Assumed number of operating cycles per year | 300 | 300 | 300 | 300 |
| Required storage volume (m3) | 3299 | 4385 | 4337 | 84677 |
| Number of storage units | 330 | 439 | 434 | 8468 |
| Electrical energy storage (MWh/cycle) | 84 | 111 | 110 | 2066 |
| Electrical energy recovery (MWh/cycle) | 165 | 227 | 226 | 4755 |
| Electrical steady-state generation (MWh/cycle) | 93 | 131 | 131 | 3023 |
| Total electrical output (MWh/cycle) | 259 | 357 | 357 | 7778 |

It is assumed that the system operates on a daily cycle comprising 8 hours of energy storage, 8 hours of steady-state generation, and 8 hours of energy recovery. It is also assumed that the steam plant is available to benefit from the transferred compression heat.

It is assumed that compressed air storage vessels of 10 m³ volume are used, designed so that four of these vessels can be fitted into a container. For the purpose of the examples shown in Table 5, it is also assumed that there are 300 operating cycles per year.

It is seen from Table 5 above, that in this particular operating cycle the total electrical output generated is approximately ×3 the stored energy. However, this depends on how much use is made of the steady-state generation mode.

The operator may balance the mass of air added to, or extracted from, the storage system over the duration of the cycle. If the compression heat cannot be used in the steam plant, the reduced performance of the compression system may be taken into account.

There is flexibility to operate either the compression system or the expansion system, or to operate both simultaneously during periods of steady-stage generation. For example, steady-state operation could be used as a transitional stage while moving from energy storage to energy recovery and vice versa.

The proposed energy storage and power cycle stores cheap off-peak energy, which may be provided by renewable energy sources, such as wind or solar. The power obtained from the expansion cycle, can be delivered at such times when the electricity demand is high and power prices are also high.

If renewable sources are used to provide the off-peak power, then carbon footprint can also be reduced. For example, the high expansion efficiency of over 90% results in the production of carbon-dioxide per kWh being substantially reduced as compared to the most efficient combined cycle plants (which typically have an efficiency of about 60%).

Figure 27:
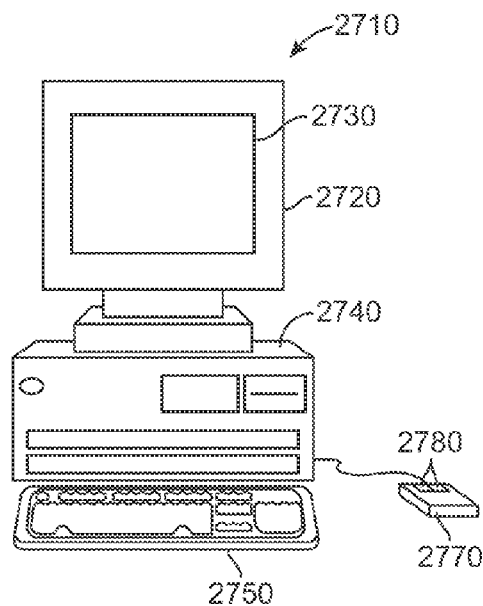
FIG. 27 shows a computing device for the purpose of processing information from the power generation and energy storage system.

Embodiments may be suited for implementation in conjunction with a host computer including a processor and a computer-readable storage medium. Such a processor and computer-readable storage medium may be embedded in the apparatus, and/or may be controlled or monitored through external input/output devices. FIG. 27 is a simplified diagram of a computing device for processing information according to an embodiment of the present invention. This diagram is merely an example, which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

FIG. 27 shows computer system 2710 including display device 2720, display screen 2730, cabinet 2740, keyboard 2750, and mouse 2770. Mouse 2770 and keyboard 2750 are representative "user input devices." Mouse 2770 includes buttons 2780 for selection of buttons on a graphical user interface device. Other examples of user input devices are a touch screen, light pen, track ball, data glove, microphone, and so forth. FIG. 27 is representative of but one type of system for embodying the present invention. It will be readily apparent to one of ordinary skill in the art that many system types and configurations are suitable for use in conjunction with the present invention. In a preferred embodiment, computer system 2710 includes a Pentium™ class based computer, running Windows™ XP™ or Windows 7™ operating system by Microsoft Corporation. However, the apparatus is easily adapted to other operating systems and architectures by those of ordinary skill in the art without departing from the scope of the present invention.

As noted, mouse 2770 can have one or more buttons such as buttons 2780. Cabinet 2740 houses familiar computer components such as disk drives, a processor, storage device, etc. Storage devices include, but are not limited to, disk drives, magnetic tape, solid-state memory, bubble memory, etc. Cabinet 2740 can include additional hardware such as input/output (I/O) interface cards for connecting computer system 2710 to external devices external storage, other computers or additional peripherals, further described below.

Figure 27A:
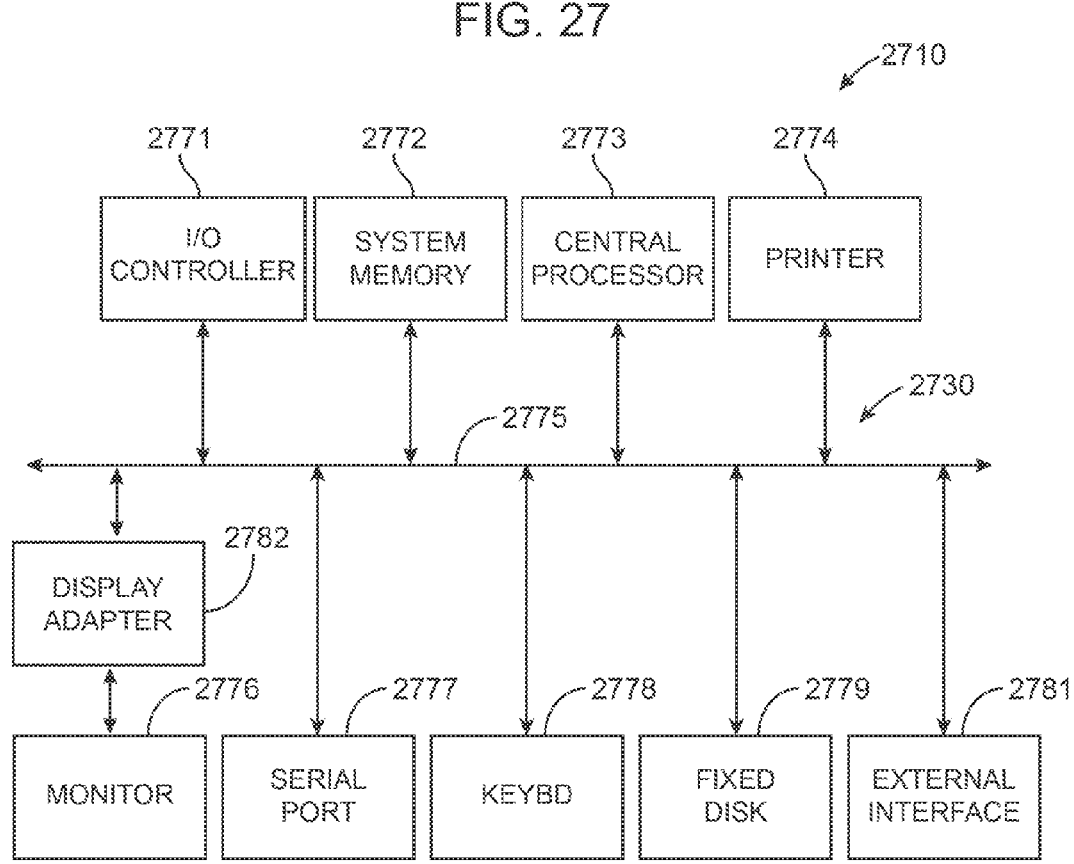
FIG. 27A is an illustration of basic subsystems in computer system of FIG. 27.

FIG. 27A is an illustration of basic subsystems in computer system 2710 of FIG. 27. This diagram is merely an illustration and should not limit the scope of the claims herein. One of ordinary skill in the art will recognize other variations, modifications, and alternatives. In certain embodiments, the subsystems are interconnected via a system bus 2775. Additional subsystems such as a printer 2774, keyboard 2778, fixed disk 2779, monitor 2776, which is coupled to display adapter 2782, and others are shown. Peripherals and input/output (I/O) devices, which couple to I/O controller 2771, can be connected to the computer system by any number of approaches known in the art, such as serial port 2777. For example, serial port 2777 can be used to connect the computer system to a modem 2781, which in turn connects to a wide area network such as the Internet, a mouse input device, or a scanner. The interconnection via system bus allows central processor 2773 to communicate with each subsystem and to control the execution of instructions from system memory 2772 or the fixed disk 2779, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Returning to FIG. 15, the various elements of the system 1800 (including the CAES Plant and/or the Steam Plant) are in communication with a central controller or processor 1560, that is in turn in electronic communication with a computer-readable storage medium 1562. The central controller or processor is also in communication with one or more sources of information 1564, which may be internal or external. Examples of internal information sources include various system sensors. Examples of external information sources include but are not limited to a smart grid, the internet, or a LAN.

As indicated above, based upon instructions in the form of computer code stored on computer-readable storage medium, the controller or processor may operate to control various elements of the system. This control may be based upon data received from various sensors in the system, values calculated from that data, and/or information received by the controller or processor from sources such as a co-situated end user or external sources.

According to embodiments, the system may be controlled to operate in one of the three modes (expansion, compression, heat engine) described above, in response to data received from one or more outside sources, such as a smart grid. Based upon the external information, a controller or processor of the processor may regulate operation of system elements in a particular manner. Examples of such external information which may be received include but are not limited to, a current price of electricity, a future expected price of electricity, a current state of demand for electricity, a future state of demand for electricity, meteorological conditions, and information regarding the state of the power grid, including the existence of congestion and possible outages.

As will be discussed below, operation of the system in accordance with embodiments of the present invention may be based upon information received by a controller or processor. In certain circumstances, operation of the system may be halted based upon information that is received. For example, where the information received indicates a high demand for electricity, operation of the system to compress air may be halted by the controller, in order to reduce a load on the grid.

Alternatively, information received by the system controller or processor may result in commencement of operation of the system. For example, received information may reveal conditions economically favorable to routing heat of compression for the purpose of steam feed water heating.

Under certain circumstances, information provided to a controller or processor may determine operation of a compressed gas storage and recovery system in a particular mode, for example an energy storage mode, energy recovery mode, or steady state generation mode. Under certain circumstances, information received by the controller may indicate a reduced price for power, causing the system to operate in compression mode in order to store energy at low cost.

Moreover, a system may operate at some balance between an efficiency of energy storage/recovery, and an amount of power that is stored/produced over a given time frame. For example, an apparatus may be designed to generate power with maximum efficiency based upon expansion of compressed gas. Expansion under other conditions may result in a greater power output, but at a reduced efficiency. Similarly, compression of gas under particular conditions may result in less efficient conversion of energy into the form of compressed gas for storage.

Under certain circumstances, embodiments may be operated under conditions of optimized efficiency. For example, where the grid indicates ordinary prices and/or demand for power, a controller may instruct components of the system to operate to compress or expand gas with maximum efficiency.

Alternatively, based upon information received from the grid or from other sources such as the internet, the controller or processor may instruct the system to operate under conditions deviating from maximum efficiency. Thus where the smart grid indicates a relatively low price for electricity (for example outside of peak demand times between 7 AM-5 PM on weekdays), the processor or controller may instruct compression of gas in a manner calculated to consume larger amounts of (relatively cheap) power for energy storage, while the price for such power is low.

According to certain embodiments, information relevant to operation of the system may be available on an ongoing basis from the external source. In such circumstances, code present in the computer-readable storage medium may instruct the system processor or controller to actively monitor the external source to detect information availability or changes in information, and then to instruct elements of the system to operate accordingly.

In some embodiments, relevant information may be actively communicated from the external source to the controller of system. When received information indicates a relatively low price for electricity (such as in the middle of the night), the processor or controller may instruct compression of gas in a manner calculated to consume larger amounts of power—for example compression of gas in large volume increments while a price is low. In such cases, the extra cost associated with the inefficiency of such compression, may be offset by the low cost of the energy that is available to perform compression.

Factors other than present demand, may influence the terms at which energy is bought and sold. For example, future power demand or future price may be considered by the controller or processor in determining conditions of operation of the apparatus.

Thus under certain circumstances where a future price of energy is expected to be particularly high, the controller or processor may operate the system in a particular manner. One example of this may be a heat wave, where demand is expected to spike based upon a meteorological forecast. In view of such an expectation, the controller or processor may instruct the system to prepare for the future conditions, for example by operating to compress additional gas—possibly with reduced efficiency—in advance of the expected spike in demand.

Other factors potentially influencing system operation, include specific contractual terms. Such terms can include a maximum load and/or minimum power output over a particular time frames, and incremental or tier-based bonuses, penalties, and multipliers for power output or consumption. Conformity or divergence from these contract terms can be an important factor in dictating operation of the system by the controller or processor.

Still another type of information potentially influencing system operation, is the expected availability of sources of energy to the power grid. For example, where information received indicates a forecast for future cloudy conditions at the site of a solar energy farm known to provide energy to the network, a processor or controller of the system could instruct the system to operate in compression and at low efficiency to store large amounts of compressed gas in advance of the expected later higher energy prices.

Yet another type of information which may be considered by a system controller or processor, is the potential availability of sources of power. For example, information may become available indicating the maintenance of certain parts of the steam plant, hence affecting the operation of associated compression and/or expansion elements.

Still other types of information that may be available to a controller or processor of an energy storage system, include profiles of congestion on a power grid. Thus where information is received indicating difficulty (or expected future difficulty) in transmitting power through certain local areas of the grid, the processor or controller could instruct operation of the system accordingly.

The controller or processor may also configure the system based upon information other than as directly available over a smart power grid. For example, according to some embodiments the controller may receive other types of information over the internet that could influence system operation, including but not limited to as weather forecasts or longer-term price futures for power, or for commodities such as coal or oil that are used in the generation of power. Based upon such information, the controller or processor can also control operation or non-operation of the system, a mode of operation of the system, and/or balance of efficiency versus power consumed or output over a given time frame.

Another possible source of information is a meter indicating current and historical consumption of electricity off of the power grid by a particular user. For example, in certain embodiments a system may be situated with an end user that is a large consumer of power, such as an industrial complex or pumping station. Based upon information received from the electrical meter for that site, the controller or processor may configure the system to operate in a certain manner.

The expected power demand of an end user is another example of information that may be used as a basis for controlling the energy storage and recovery system. For example, where an industrial facility expects to operate at enhanced or reduced capacity, that information could be utilized to determine system operation In addition to information from external sources, the controller or processor also receives information internal to the system, including both the CAES plant and the steam plant. Such internal information may include data from sensors configured to measure physical parameters within the system, including but not limited to valve state, temperature, pressure, volume, humidity, flow rates of liquids and gases, and speeds and torques of moveable elements within the system, such as fans, pumps, pistons, and shafts in communication with pistons. Additional examples of internal information which may be provided to the controller or processor include but are not limited to power drawn by the operation of motors such as pumps or fans.

In a broad sense, the controller or processor may regulate the function of a system element to determine whether the system operates at all. An example of such an element is the valving between compressed gas storage and the compressor/expander. Closure of this valve would prevent operation of the system in compression mode to flow gas into the storage unit. Closure of this valve would also prevent operation of the system in expansion mode to flow gas from the storage unit for energy recovery. Thus where a pressure within a storage vessel indicates near-depletion of the compressed gas, the controller or processor may halt operation of the system until conditions allow replenishment of the gas supply under economically favorable conditions.

When the system is operating, the controller or processor may regulate a system element to determine the operational mode. An example of this kind of system element is a valve such as a three-way valve. The state of such a valve could be regulated by the controller to control flows of liquids or gases within the system in a manner corresponding to a particular mode of operation. Thus where a pressure within a storage vessel indicates near-depletion of the compressed gas, the controller or processor may instruct operation of the system in a compression mode to replenish the gas supply.

The controller or processor may also regulate an element of the system to determine a manner of operation within a particular operational mode. For example, the efficiency of operation of the compressor/expander may depend upon the volume increments of gas which are compressed or expanded.

Regulation of operation of system elements by the controller may be based upon considerations in addition to, or in lieu of, output electrical power or efficiency. For example, in some applications, the system may function in a temperature control role, providing deliverable quantities in the form of heating or cooling capacity. Under such circumstances, the controller may control system operating parameters such as the injection or non-introduction of liquid in one or more stages, the conditions of liquid introduction in one or more stages, compression or expansion ratios of one or more stages, and other parameters in order to determine the end temperature of gases and/or liquids output from the system that may be used for such temperature control.

Cost is another example of a such a consideration for system operation. For example, actuation of a valve by the controller to compress gas in smaller volume increments, may be dictated by the controller where conditions warrant compression but a price of energy available from the power grid is relatively high. In another example, operation of a valve by the controller such that gas is expanded in smaller volume increments, may be dictated by the controller where conditions warrant expansion but a price for energy supplied to the power grid is relatively low.

Available capacity for storage of compressed gas represents is another factor that may be considered in system operation. For example, valve timing could be regulated for compression in smaller volume increments where the storage unit is nearing its capacity. Under other circumstances, valve timing could be regulated for expansion in smaller volume increments where the storage unit is nearing depletion.

Still another possible consideration in operating system elements by controller, is coordination of activity between individual stages of a multi-stage apparatus. Thus in embodiments comprising multiple stages, certain system elements may be operated by the controller in order to allow effective coordination between those stages.

One example is the timing of actuation of inlet or outlet valves to compression/expansion chambers, which may be regulated by a controller in order to allow effective operation across multiple stages. Timing of actuation of valves responsible for flows of liquid between stages, is another example of an operational parameter that may be regulated by a system controller.

Moreover, in some embodiments the individual stages of certain systems may be in fluid communication with each other through intermediary structures, including but not limited to pressure cells, heat exchangers, valves/valve networks, gas vessels, gas/liquid separators, and/or liquid reservoirs. In such embodiments, elements governing flows of materials into and/or out of such intermediary structures, may be regulated by a system controller in order to coordinate system operation. In some cases, it may be advantageous to control the relative phase of cyclically moving members in various stages to minimize pressure differentials seen by valves between those stages.

What is claimed is:

1. A method comprising:
    providing a thermal power plant operating on a steam Rankine cycle and including a boiler, a steam turbine, and steam feed water from a condenser and configured to be heated by steam bled from the steam turbine;
    providing energy from an external energy source to a gas compression process;
    storing compressed gas from the gas compression process in a compressed gas storage unit;
    communicating thermal energy from the gas compression process to heat the steam feed water, wherein the thermal energy is communicated from an aftercooler of a gas compressor;
    flowing the steam feed water to the boiler;
    providing an existing gas turbine of single shaft design that has been modified to remove compressor blades to obtain a compressorless gas turbine;
    flowing compressed gas from the gas compression process to a turbine comprising an air turbine in communication with the compressorless gas turbine; and
    heating the compressed gas with a combustion product of an output of the compressorless gas turbine.

2. A method as in claim 1 wherein the gas compressor comprises a reciprocating member.

3. A method as in claim 1 wherein the thermal energy is communicated from an intercooler of a gas compressor.

4. A method as in claim 3 wherein the gas compressor comprises a rotating member.

5. A method as in claim 3 wherein the gas compressor comprises multiple reciprocating stages.

6. A method as in claim 1 further comprising storing the thermal energy.

7. A method as in claim 1 wherein the external energy source comprises a renewable energy source.

8. A method as in claim 7 wherein the renewable energy source is intermittent.

9. A method as in claim 7 wherein the renewable energy source comprises wind.

10. A method as in claim 7 wherein the renewable energy source comprises solar.

11. A method as in claim 7 wherein the renewable energy source provides the energy off-peak.

12. A method as in claim 1 wherein the thermal power plant involves combustion.

13. A method as in claim 1 wherein the thermal power plant involves a nuclear reaction.

14. A method as in claim 1 further comprising storing the water in a thermal storage unit prior to flowing to the boiler.

* * * * *